United States Patent
Kang

(10) Patent No.: US 9,760,308 B2
(45) Date of Patent: Sep. 12, 2017

(54) NONVOLATILE MEMORY SYSTEM AND OPERATION METHOD OF THE SAME

(71) Applicant: Samsung Electronics Co., Ltd., Suwon-si, Gyeonggi-do (KR)

(72) Inventor: Nam Wook Kang, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/048,988

(22) Filed: Feb. 19, 2016

(65) Prior Publication Data

US 2016/0306590 A1 Oct. 20, 2016

(30) Foreign Application Priority Data

Apr. 20, 2015 (KR) ........................ 10-2015-0055408

(51) Int. Cl.
*G11C 16/04* (2006.01)
*G06F 3/06* (2006.01)

(52) U.S. Cl.
CPC .......... *G06F 3/0652* (2013.01); *G06F 3/0608* (2013.01); *G06F 3/0679* (2013.01); *G06F 3/0659* (2013.01)

(58) Field of Classification Search
CPC ...................................................... G11C 16/04
USPC ....................... 365/185.01–185.33
See application file for complete search history.

(56) References Cited

U.S. PATENT DOCUMENTS

| | | | |
|---|---|---|---|
| 6,880,038 B2 | 4/2005 | Jacobs | |
| 7,679,133 B2 | 3/2010 | Son et al. | |
| 8,031,536 B2 | 10/2011 | Yamagami et al. | |
| 8,316,177 B2 | 11/2012 | Conley | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,681,554 B2 | 3/2014 | Suzuki | |
| 8,806,113 B2 | 8/2014 | Lasser et al. | |
| 9,094,190 B2 | 7/2015 | Park et al. | |
| 2004/0143698 A1 | 7/2004 | Jacobs | |

(Continued)

FOREIGN PATENT DOCUMENTS

| | | |
|---|---|---|
| JP | 2010165039 | 7/2010 |
| KR | 100988414 A | 10/2010 |
| KR | 20140019599 | 2/2014 |

*Primary Examiner* — Harry W Byrne
(74) *Attorney, Agent, or Firm* — Renaissance IP Law Group LLP

(57) ABSTRACT

A nonvolatile memory system comprises a nonvolatile memory device including a plurality of memory blocks. The nonvolatile memory system includes a memory controller, which can control the nonvolatile memory device, and manage start and end reception times of data of each of the memory blocks. The memory controller can cause at least one of the memory blocks to be physically erased based on the managed start and end reception times. A data eliminating unit can physically erase one or more target blocks from among the memory blocks based on a block timetable in response to a data elimination command having a reference time received from a host. An operation method of a nonvolatile memory system can include selecting one or more target blocks for physical erasure in response to the data elimination command, and physically erasing the selected target blocks.

12 Claims, 30 Drawing Sheets

(56) References Cited

U.S. PATENT DOCUMENTS

| | | | |
|---|---|---|---|
| 2006/0062048 A1* | 3/2006 | Gonzalez | G06F 11/106 365/185.11 |
| 2007/0165457 A1* | 7/2007 | Kim | G06F 13/1684 365/185.11 |
| 2009/0121271 A1 | 5/2009 | Son et al. | |
| 2010/0191902 A1 | 7/2010 | Yamagami et al. | |
| 2010/0195463 A1* | 8/2010 | Kurashige | G11B 19/02 369/53.45 |
| 2011/0022789 A1* | 1/2011 | Fujimoto | G06F 1/266 711/103 |
| 2011/0216603 A1 | 9/2011 | Han et al. | |
| 2011/0233648 A1 | 9/2011 | Seol et al. | |
| 2011/0258386 A1 | 10/2011 | Conley | |
| 2012/0051133 A1 | 3/2012 | Kanda | |
| 2012/0051143 A1 | 3/2012 | Yoon et al. | |
| 2013/0016561 A1* | 1/2013 | Nam | H01L 27/11556 365/185.11 |
| 2013/0051144 A1 | 2/2013 | Suzuki | |
| 2013/0067151 A1 | 3/2013 | Lasser et al. | |
| 2013/0246688 A1 | 9/2013 | Kanno et al. | |
| 2013/0279262 A1 | 10/2013 | Yoon et al. | |
| 2014/0032993 A1 | 1/2014 | Yang et al. | |
| 2014/0037093 A1 | 2/2014 | Park et al. | |
| 2014/0269071 A1* | 9/2014 | Pandya | G11C 16/10 365/185.11 |
| 2014/0293697 A1* | 10/2014 | Moschiano | G11C 16/349 365/185.12 |

\* cited by examiner

NONVOLATILE MEMORY SYSTEM AND OPERATION METHOD OF THE SAME

CROSS-REFERENCE TO RELATED APPLICATIONS

This US non-provisional patent application claims priority under 35 USC §119 to Korean Patent Application No. 10-2015-0055408, filed on Apr. 20, 2015, the entirety of which is hereby incorporated by reference.

BACKGROUND

The present disclosure relates to semiconductor memories and, more particularly, to nonvolatile memory systems and operating methods of the same.

Semiconductor memory device are memory devices implemented using a semiconductor such as silicon (Si), germanium (Ge), gallium arsenide (GaAs), and indium phosphide (InP). In broad terms, semiconductor memory devices are classified into volatile memory devices and nonvolatile memory devices.

In contrast to nonvolatile memory devices, volatile memory devices lose their stored data when their power supplies are interrupted. Nonvolatile memory devices retain their stored data even when their power supplies are interrupted. Volatile memory devices may include, for example, a static random access memory RAM (SRAM), a dynamic RAM (DRAM), a synchronous DRAM (SDRAM), or the like. Nonvolatile memory devices may include, for example, a read only memory (ROM), a programmable ROM (PROM), an electrically programmable ROM (EPROM), an electrically erasable and programmable ROM (EEPROM), a flash memory device, a phase change RAM (PRAM), a magnetic RAM (MRAM), a resistive RAM (RRAM), and a ferroelectric RAM (FRAM), or the like.

Flash memories have been used in a variety of applications due to low noise, low power consumption, and high-speed operation. A flash memory performs a read operation and a write operation in units of pages different from a data management unit of a host and has an "erase-after-write" characteristic, unlike a typical hard disk. Therefore, a separate management method is used.

In general, a storage device based on a flash memory manages data via a flash translation layer (FTL). The flash translation layer performs an operation to translate a logical address from a host into a physical address of the storage device. In particular, when data is erased by the host, a flash memory-based storage device processes data by updating a mapping table managed by the flash translation layer, and treating stored data as invalid data—instead of actually erasing the stored data. Consequently, since user data is retained in the storage device even when the user data is "erased" by the host, a user data security problem exists, because the data is not necessarily erased in the storage device.

Recently, focus has been shifting toward improved security among consumer and business devices. For example, some programs or applications encode user data to improve security and erase the user data after the lapse of predetermined time. However, as mentioned above, since actual data is retained in a flash memory-based storage device even when user data is thought to be erased, a user data security problem persists. Embodiments of the inventive concept disclosed herein address these and other problems.

SUMMARY

The present disclosure relates to a nonvolatile memory system and an operating method of the nonvolatile memory system.

Example embodiments of inventive concepts provide a nonvolatile memory system. The nonvolatile memory system may include a nonvolatile memory device including a plurality of memory blocks. The nonvolatile memory system may include a memory controller configured to control the nonvolatile memory device based on one or more commands received from a host. The memory controller may manage a start reception time and an end reception time of data of each of the plurality of memory blocks. The memory controller may physically erase at least one memory block from among the plurality of memory blocks based on the managed start reception time and the managed end reception time.

Example embodiments of inventive concepts provide an operation method of a nonvolatile memory system. The nonvolatile memory system may include a nonvolatile memory device including a plurality of memory blocks and a memory controller configured to control the nonvolatile memory device. The operation method may include receiving a data elimination command from a host. The operation method may include selecting, based on a block timetable including a start reception time and an end reception time of data of each of the plurality of memory blocks, a target block from among the plurality of memory blocks in response to the received data elimination command. The operation method may include physically erasing the selected target block.

Example embodiments of inventive concepts provide a memory controller. The memory controller may include a memory circuit configured to store a block time table including a start reception time and an end reception time of data associated with each of a plurality of memory blocks. The start reception time may indicate a reception time of first received data among data associated with a particular block from among the plurality of memory blocks. The end reception time may indicate a reception time of last received data among the data associated with the particular block from among the plurality of memory blocks. The memory controller may include a data eliminating unit configured to physically erase one or more target blocks from among the plurality of memory blocks based on the block timetable in response to a data elimination command having a reference time received from a host.

BRIEF DESCRIPTION OF THE DRAWINGS

The forgoing and other features of inventive concepts will be described below in more detail with reference to the accompanying drawings of non-limiting embodiments of inventive concepts in which like reference characters refer to like parts throughout the different views. The drawings are not necessarily to scale, emphasis instead being placed upon illustrating principles of inventive concepts. In the drawings.

DETAILED DESCRIPTION

Figure 1:
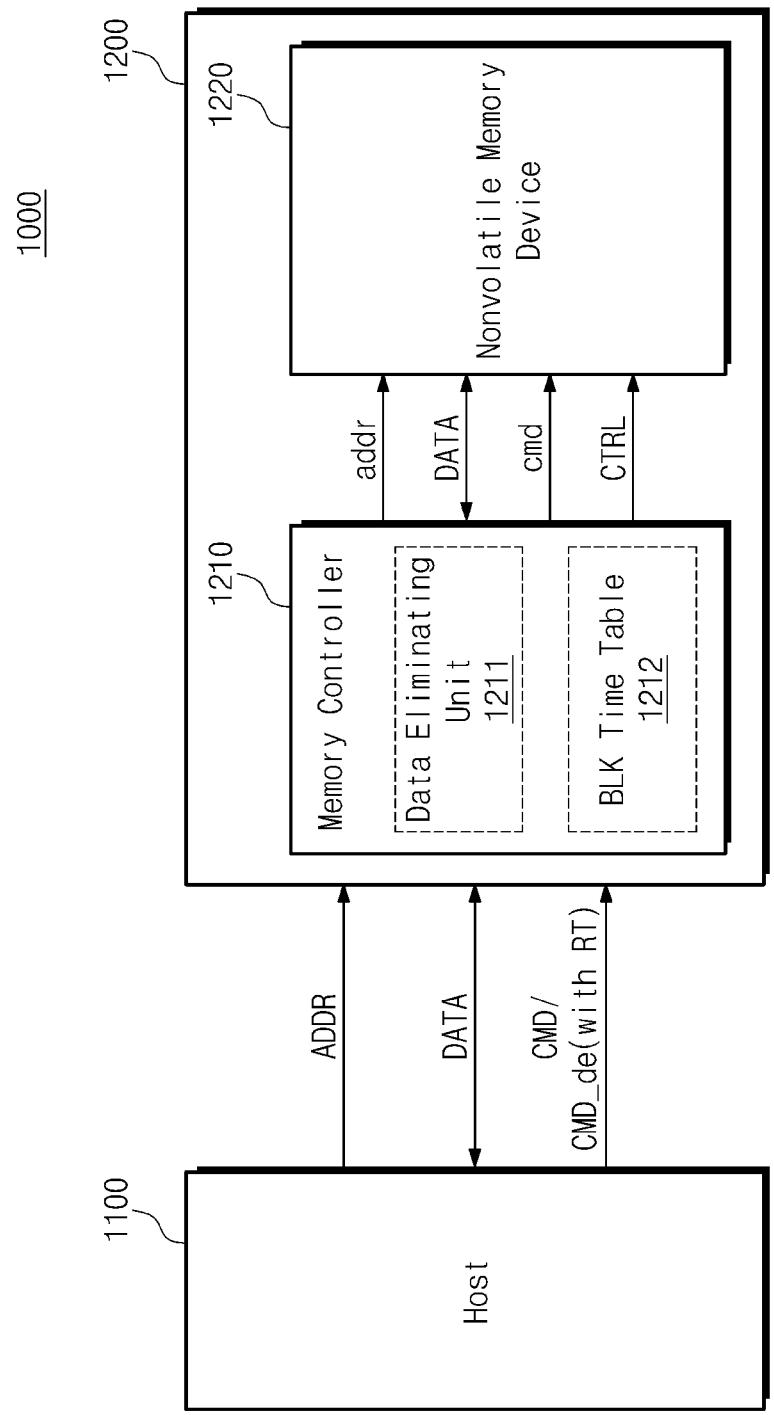
FIG. 1 is an example block diagram of a user system according to example embodiments of inventive concepts.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

A nonvolatile memory system according to example embodiments of inventive concepts described herein may manage reception time of data stored in each of a plurality of memory blocks. The nonvolatile memory system according to example embodiments of inventive concepts described herein may fully erase, secure-erase, and/or physically erase the data based on the managed reception time. That is, the nonvolatile memory system may physically erase data received before a certain time point, may physically erase data received after a certain time point, and/or may physically erase data received between certain time periods. Thus, security of the nonvolatile memory system may be improved.

FIG. 1 is an example block diagram showing a user system 1000 according to example embodiments of inventive concepts. Referring to FIG. 1, the user system 1000 includes a host 1100 and a nonvolatile memory system 1200. In some embodiments, the user system 1000 may include at least one of a computer, a portable computer, an ultra mobile PC (UMPC), a workstation, a net-book, a personal digital assistant (PDA), a web tablet, a wireless phone, a mobile phone, a smart phone, a digital camera, a digital audio recorder, a digital audio player, a digital video recorder, a digital video player, a device capable of transmitting receiving information under a wireless environment, or various devices constituting a home network.

The host 1100 may store data DATA in the nonvolatile memory system 1200 or read data DATA from the nonvolatile memory system 1200 according to a request of a user or various application programs. For example, the host 1100 may transmit signals such as an address ADDR, data DATA, and/or a command CMD to the nonvolatile memory system 1200.

The nonvolatile memory system 1200 includes a memory controller 1210 and a nonvolatile memory device 1220. The nonvolatile memory system 1200 may store data DATA from the host 1100 or transmit stored data DATA to the host 1100 in response to signals from the host 1100. In some embodiments, the nonvolatile memory system 1200 may be provided as a storage device such as a multimedia card (MMC), an embedded MMC, a solid-state drive (SSD), a USB memory stick, a universal flash storage (UFS), or the like.

The memory controller 1210 may control the nonvolatile memory device 1220 in response to the signals received from the host 1100. For example, the memory controller 1210 may transmit signals such as an address addr, a command cmd, and a control signal CTRL to the nonvolatile memory device 1200 in response to signals received from the host 1100. Moreover, the memory controller 1210 may exchange data DATA with the nonvolatile memory device 1220.

In some embodiments, the signals provided from the host 1100 (i.e., the address ADDR, the command CMD, etc.) may be signals defined by a predetermined interface between the host 1100 and the nonvolatile memory system 1200. In some embodiments, the signals provided from the memory controller 1210 to the nonvolatile memory device 1220 (i.e., the address addr, the command cmd, the control signal CTRL, etc.) may be signals defined by a predetermined interface between the memory controller 1210 and the nonvolatile memory device 1220.

The interface between the host 1100 and the nonvolatile memory system 1200 may include at least one of various communication protocols such as a Universal Serial Bus (USB), a multimedia card (MMC), a peripheral component interconnection (PCI), a PCI-express, an Advanced Technology Attachment (ATA), a Serial-ATA, a Parallel-ATA, a small computer small interface (SCSI), an enhanced small disk interface (ESDI), an Integrated Drive Electronics), a Mobile Industry Processor Interface (MIPI), a Nonvolatile Memory-express (NVMe), or the like. In some embodiments, the interface between the memory controller 1210 and the nonvolatile memory device 1220 may include a NAND interface.

In some embodiments, the address ADDR provided from the host 1100 may indicate a logical address of data defined by an operating system (OS) or a file system of the host 1100. The memory controller 1210 may translate a logical address ADDR into a physical address addr used in the nonvolatile memory device 1220, and provide the physical address addr to the nonvolatile memory device 1220.

The nonvolatile memory device 1220 may store data DATA or output stored data DATA under the control of the memory controller 1210. In some embodiments, the nonvolatile memory device 1220 may include at least one semiconductor memory. For example, the nonvolatile memory device 1220 may be implemented based on at least one nonvolatile memory device such as NAND flash memory, NOR flash memory, PRAM, ReRAM, FRAM, and MRAM, or the like.

In some embodiments, the nonvolatile memory device 1200 may fully erase (i.e., physically erase) data received from a host for a certain time period. For example, the host 1100 may transmit a data elimination command CMD_de to the nonvolatile memory system 1200. In some embodiments, the data elimination command CMD_de may include information on reference time RT. The reference time RT may be reference time for selecting data to be physically eliminated. In some embodiments, the data elimination command CMD_de may be provided as a command defined by a predetermined interface between the host 1100 and the nonvolatile memory system 1200, a vendor command, a preliminary command, and/or combinations of commands.

The memory controller 1210 may include a data eliminating unit 1211 and a block timetable 1212. The block timetable 1212 may manage reception time of data stored in each of a plurality of memory blocks. For example, the block timetable 1212 may manage reception time of first received data and reception time of recently received data among the stored data, for each of the memory blocks. In some embodiments, reception time of data may indicate a time at which the data is received to the nonvolatile memory system 1200, or a time at which the data is transmitted from the host 1100. For the sake of brevity of description, it will be assumed that the data reception time is a time at which data is transmitted from the host 1100. However, example embodiments are not limited thereto and a meaning of the reception time may extend to a time at which data is programmed into the nonvolatile memory device 1220, a time period at which a plurality of data are received, a time at which data is received by the nonvolatile memory system 1200, a time at which data is received by the memory controller 1210, or the like. In addition, the reception time may be time defined by the host 1100, a relative time, and/or an absolute time used in the nonvolatile memory system 1200.

The data eliminating unit 1211 may physically erase target blocks among a plurality of memory blocks included in the nonvolatile memory device 1200 based on the block timetable 1212 in response to the data elimination command CMD_de received from the host 1100. For example, the data eliminating unit 1211 may select a memory block in which data received before reference time RT is stored based on the block timetable 1212, and may physically erase the selected memory block in response to the data elimination command CMD_de. Alternatively or in addition, the data eliminating unit 1211 may select a memory block in which data received between reference time RT and current time is stored based on the block timetable 1212, and may physically erase the selected memory block in response to the data elimination command CMD_de. Alternatively or in addition, the data eliminating unit 1211 may select a memory block in which data received at a certain time period is stored based on the block timetable 1212, and may physically erase the selected memory block in response to the data elimination command CMD_de.

When data is erased at a host, a conventional nonvolatile memory system based on a flash memory merely releases a relationship between a logical address managed by the host and a physical address of the nonvolatile memory device. In this case, the user data is retained in the nonvolatile memory device even though the mapping relationship between the logical address and the physical address is released, thereby causing a security problem such as data leakage or unintentional persistent data.

However, according to the above-described embodiments of the inventive concept, data received at a certain time period based on a data reception time and reference time RT, before the certain time period, or after the certain time period, may be fully erased (i.e., removed, eliminated, or physically erased). That is, since the data received at the certain time period, before the certain time period, or after the certain time period, is fully removed in the nonvolatile memory device 1220, security of the nonvolatile memory system 1200 is improved.

Figure 2:
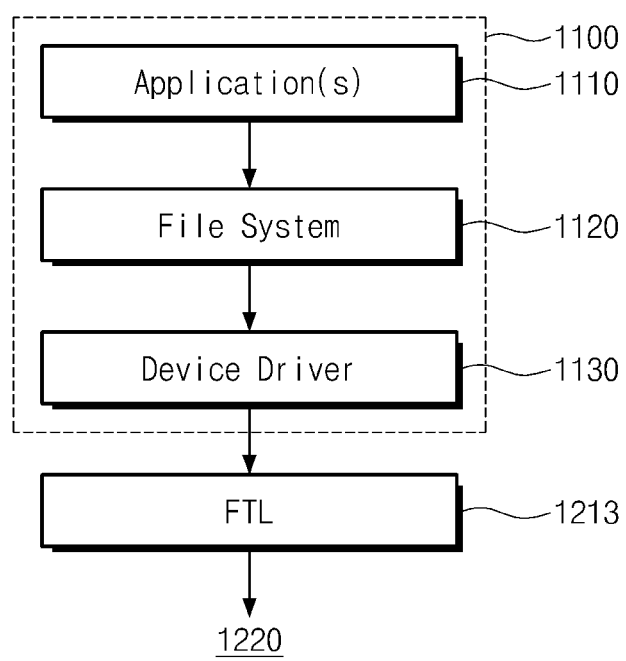
FIG. 2 is an example block diagram of a software layer of the user system of FIG. 1.

FIG. 2 is an example block diagram of a software layer of the user system 1000 of FIG. 1. Referring to FIGS. 1 and 2, the host 1100 includes one or more applications 1110, a file system 1120, and/or a device driver 1130.

The one or more applications 1110 may include various application programs driven on an operating system (OS) of the host 1100. For example, the one or more applications 1110 may include various programs such as a text editor, a video player, a web browser, or the like.

The file system 1120 may perform an operation to organize a file or data used by the one or more applications 1110 when the file or the data is stored in the nonvolatile memory device 1220. For example, the file system 1120 may provide an address ADDR of a file or data. In some embodiments, the address ADDR may be a logical address managed by the file system 1120. The file system 1120 may be provided in various forms according to an operating system. For example, the file system 1120 may include a File Allocation Table (FAT), a FAT32, an NT File System (NTFS), a Hierarchical File System (HFS), a Journaled File System2 (JSF2), XFS, an On-Disk Structure-5 (ODS-5), a UDF, a ZFS, a Unix File System (UFS), ext2, ext3, ext4, ReiserFS, Reiser4, ISO 9660, Gnome VFS, BFS, WinFS, or the like. In some embodiments, the file system 1120 may define data by a sector unit.

The device driver 1130 is a program to control devices included in the host 1100 and devices connected with the host 1100. The device driver 1130 may perform an operation to convert input/output command of the operating system into a message corresponding to respective devices. The device driver 1130 may control the nonvolatile memory system 1200. For example, the device driver 1130 may transmit a command CMD, an address ADDR, and/or data DATA to the nonvolatile memory system 1200 according to a read or write request of a user, an application, and/or an operating system.

The flash translation layer 1213 (hereinafter referred to as "FTL 1213") may provide an interface between the host 1100 and the nonvolatile memory device 1220 to efficiently use the nonvolatile memory device 1220. For example, the nonvolatile memory device 1220 may write and read data in units of pages. However, since the file system 1120 of the host 1100 manages data or a file in units of sectors, the FTL 1213 receives an address ADDR and translates the received address ADDR into an address addr that can be used in the nonvolatile memory device 1220. The FTL 1213 may manage the address translation operation via a mapping table.

In some embodiments, the FTL 1213 may perform an operation such as garbage collection, wear-leveling, and/or read reclaim. For example, the FTL 1213 may perform garbage collection to copy at least one valid page included in at least one memory block to a free memory block, and to physically erase the at least one memory block. In some embodiments, the FTL 1213 may perform the operation of the data eliminating unit 1211 described with reference to FIG. 1.

Figure 3:
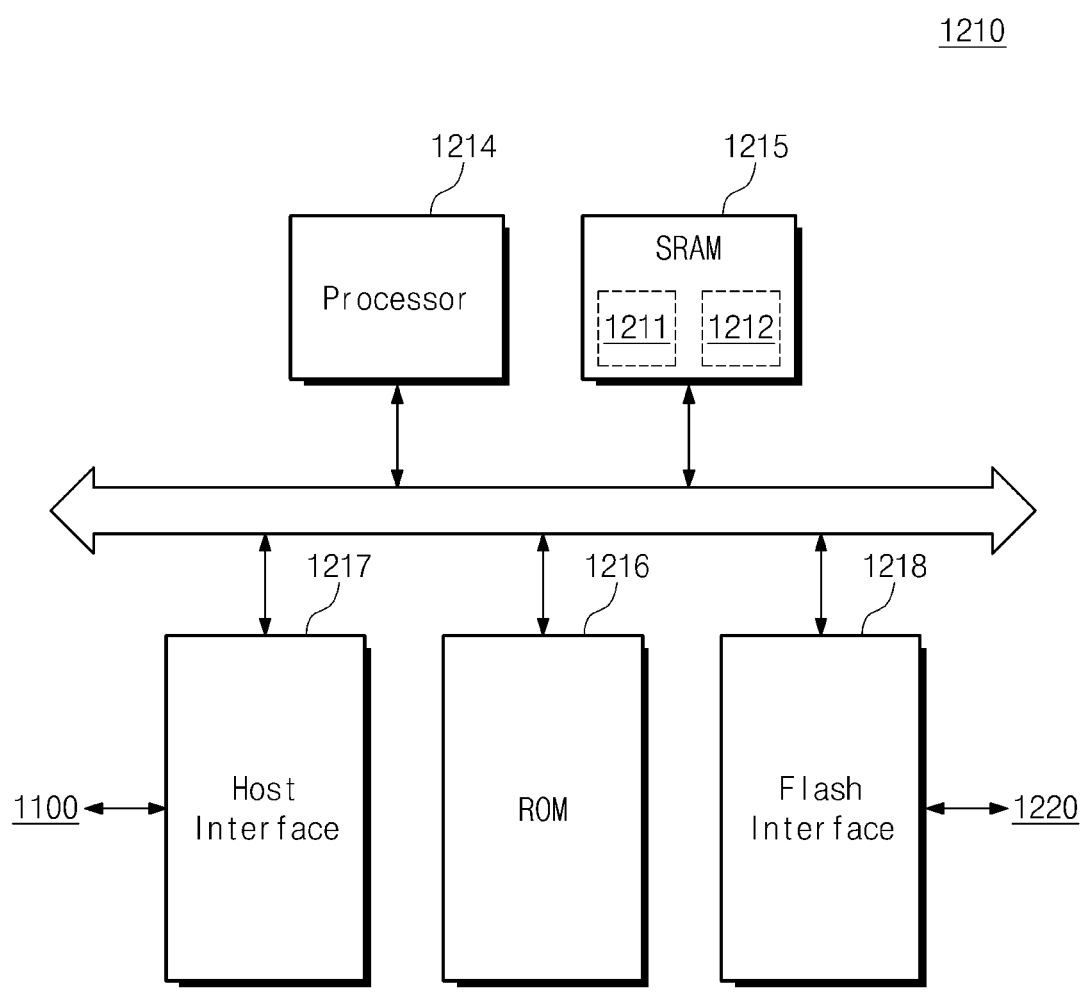
FIG. 3 is an example block diagram showing additional detail of a memory controller of FIG. 1.

FIG. 3 is an example block diagram showing additional detail of the memory controller 1210 of FIG. 1. Referring to FIGS. 1 to 3, the memory controller 1210 may include a processor 1214, an SRAM 1215, a ROM 1216, a host interface 1217, and/or a flash interface 1218.

The processor 1214 may control the overall operation of the memory controller 1210. The SRAM 1215 may be used as a buffer memory, a main memory, a cache memory, or the like, of the memory controller 1210. In some embodiments, the SRAM 1215 may store information, data, and/or a program to operate the memory controller 1210.

In some embodiments, the data eliminating unit 1211 and the block timetable 1212 described with reference to FIG. 1 may be provided in the form of software, firmware, hardware, or the like, and may be stored in the SRAM 1215. The data eliminating unit 1211 and the block timetable 1212 stored in the SRAM 1215 may be driven or managed by the processor 1214. In some embodiments, the data eliminating unit 1211 and the block timetable 1212 may be included in the FTL 1213. The FTL 1213 may be stored in the SRAM 1215. The FTL 1213 stored in the SRAM 1215 may be driven or managed by the processor 1214. In some embodiments, an updated block timetable 1212 may be periodically flushed to the nonvolatile memory device 1220.

The ROM 1216 may store various information required to operate the memory controller 1210, and which may be in the form of firmware. The firmware stored in the ROM 1216 may be driven by the processor 1214.

The memory controller 1210 may communicate with the host 1100 via the host interface 1217. The memory controller 1210 may communicate with the nonvolatile memory device 1220 via the flash interface 1210.

Although not shown in FIG. 3, the memory controller 1210 may further include additional components such as a data randomizer, an error correction code circuit (ECC circuit), a separate buffer memory, or the like.

Figure 4:
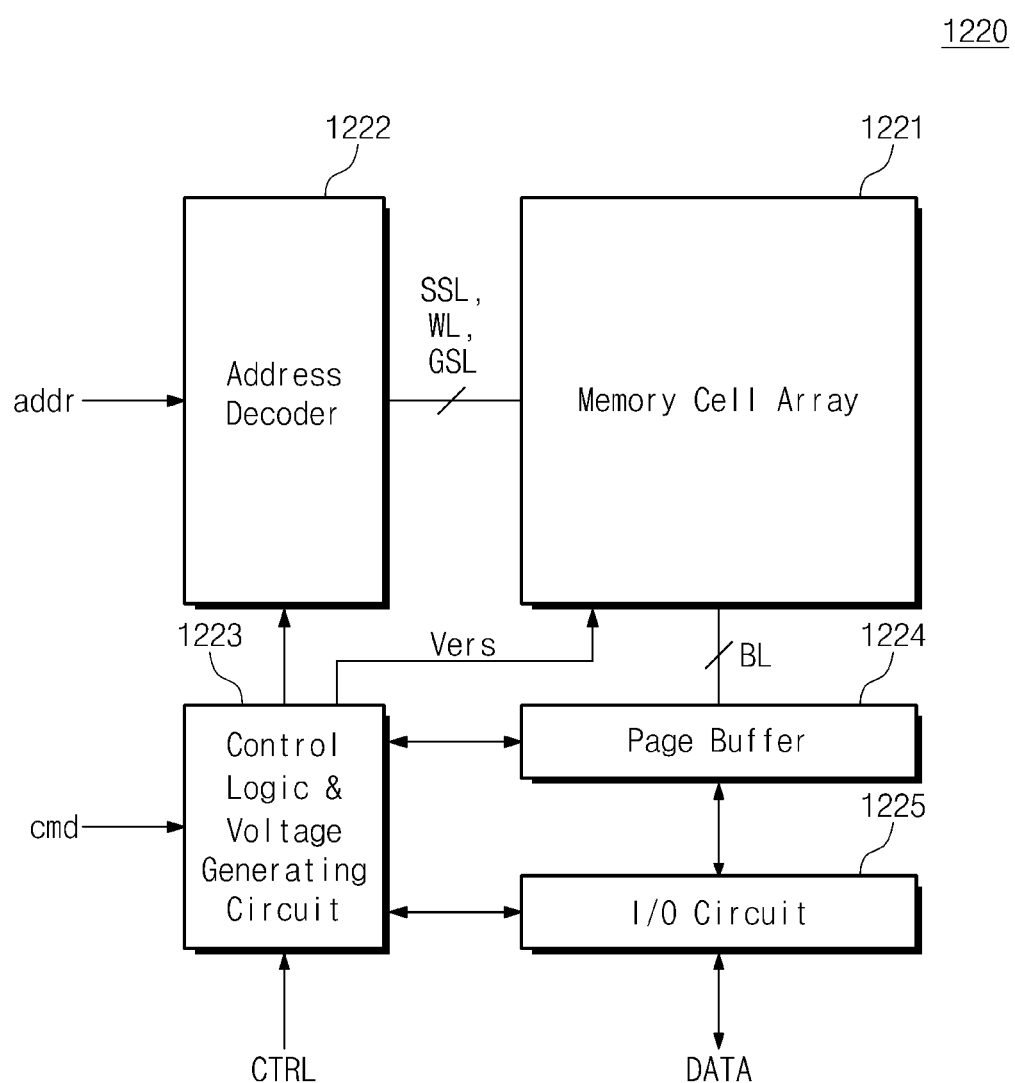
FIG. 4 is an example block diagram showing additional detail of a nonvolatile memory device of FIG. 1.

FIG. 4 is an example block diagram showing additional detail of the nonvolatile memory device 1220 of FIG. 1. Referring to FIGS. 1 and 4, the nonvolatile memory device 1220 may include a memory cell array 1221, an address decoder 1222, a control logic and voltage generating circuit 1223, a page buffer 1224, and/or an input/output (I/O) circuit 1225.

The memory cell array 1221 includes a plurality of memory blocks. Each of the memory blocks includes a plurality of strings. Each of the strings includes a plurality of memory cells. The memory cells are connected to a plurality of wordlines WL, respectively. Each of the memory cells may include a single-level cell (SLC) storing one bit per cell or a multi-level cell (MLC) storing at least two bits per cell.

The address decoder 1222 is connected to the memory cell array 1221 via a plurality of wordlines WL, string selection lines SSL, and/or ground selection lines GSL. The address decoder 1222 receives an address addr from the memory controller 1210. The address decoder 1222 may decode the received address addr and control the wordlines WL based on the decoded address addr. For example, the address decoder 1222 may select at least one of the wordlines WL based on the decoded address addr and control a voltage of the selected wordline.

The control logic and voltage generating circuit 1223 may receive a command cmd and a control signal CTRL from the memory controller 1210 (of FIG. 3) and control the address decoder 1222, the page buffer 1224, and/or the I/O circuit 1225 in response to the received signals. For example, the control logic and voltage generating circuit 1223 may control the address decoder 1222, the page buffer 1224, and the I/O circuit 1225 to write data DATA received from the memory controller 1210 (of FIG. 3) into the memory cell array 1221, or to read data DATA stored in the memory cell array 1221.

The control logic and voltage generating circuit 1223 may generate various voltages required to operate the nonvolatile memory device 1220. For example, the control logic and voltage generating circuit 1223 may generate various voltages such as a plurality of program voltages, a plurality of pass voltages, a plurality of select read voltages, a plurality of unselect read voltages, a plurality of erase voltages, a plurality of verify voltages, and/or a plurality of erase verify voltages, or the like.

The page buffer 1224 is connected to the memory cell array 1221 via a plurality of bitlines BL. The page buffer 1224 may temporarily store data DATA provided from the I/O circuit 1225. The data DATA stored in the page buffer 1224 may be stored in the memory cell array 1221 under the control of the control logic and voltage generating circuit 1223. The page buffer 1224 may temporarily store data DATA read from the memory cell array 1221. The page buffer 1224 may provide the read data DATA to the I/O circuit 1225 under the control of the control logic and voltage generating circuit 1223.

The I/O circuit 1225 may receive data DATA from the memory controller 1210 (of FIG. 3). The I/O circuit 1225 may provide the received data DATA to the page buffer 1224. The I/O circuit 1225 may provide the data DATA provided from the page buffer 1224 to the memory controller 1210 (of FIG. 3) under the control of the control logic and voltage generating circuit 1223.

In some embodiments, the nonvolatile memory device 1220 may supply an erase voltage Vers generated in the control logic and voltage generating circuit 1223 to a substrate of the memory cell array 1221 during an erase operation (i.e., physical erase operation). The nonvolatile memory device 1220 may supply a wordline erase voltage to wordlines connected to a memory block to be erased (i.e., target memory block) during the erase operation. In some embodiments, wordline voltages applied to a plurality of wordlines during an erase operation of the nonvolatile memory device 1200 may vary depending on a size or an operating speed of each of memory cells included in the memory cell array 1221. In some embodiments, threshold voltages of memory cells included in a physically erased memory block may be included in a threshold voltage distribution range of an erase state. Alternatively or in addition, threshold voltages of memory cells included in a physically erased memory block may be included in a specific threshold voltage distribution range.

In some embodiments of inventive concepts, the nonvolatile memory device 1220 may include a three-dimensional (3D) memory array. The 3D memory array may be monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In some embodiments of inventive concepts, the 3D memory array may include vertical NAND strings that are vertically oriented such that one or more memory cells are located over another memory cell. The one or more memory cells may comprise a charge trap layer. Each vertical NAND string may include one or more select transistors located over memory cells. The one or more select transistors may have the same structure with the memory cells and may be formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 5:
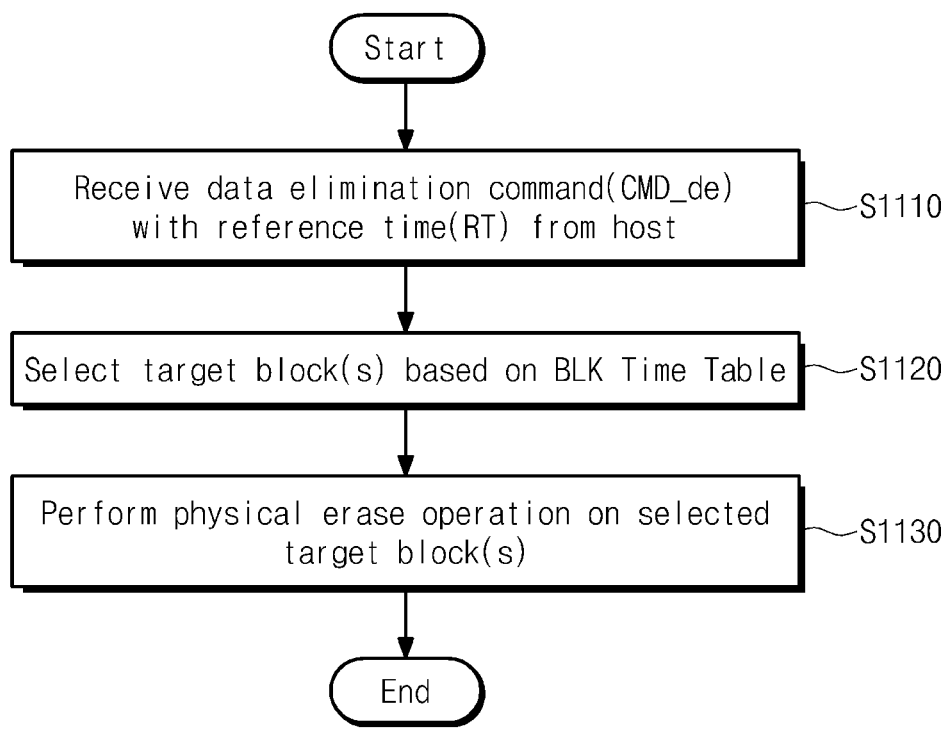
FIG. 5 is a flowchart showing an operation of the memory controller of FIG. 1.

FIG. 5 is a flowchart showing an operation of the memory controller 1210 of FIG. 1. Hereinafter, a data eliminating method based on reception time of the memory controller 1210 (of FIG. 1) according to example embodiments of inventive concepts is described in detail with reference to accompanying drawings.

Referring to FIGS. 1 and 5, in a step S1110, the memory controller 1210 receives a data elimination command CMD_de and reference time RT from the host 1100. In some embodiments, the reference time RT may be included in the data elimination command CMD_de. Alternatively or in addition, the reference time RT may be provided through a command separate from the data elimination command CMD_de. In some embodiments, the data elimination command CMD_de may be provided as a signal such as a command predefined by an interface between the nonvolatile memory system 1200 and the host 1100, a preliminary command, a vendor command, a combination of a plurality of commands, and/or a newly defined command, or the like.

In a step S1120, the memory controller 1120 selects at least one target block based on the block timetable 1212. For example, the block timetable 1212 includes reception time of data stored in each of a plurality of memory blocks, as described with reference to FIG. 1. The memory controller 1210 may select at least one memory block, in which data received between the received reference time RT and current time is stored, as a target block. Alternatively or in addition, the memory controller 1210 may select memory blocks, in which data received before the received reference time RT is stored, as target blocks. Alternatively or in addition, the memory controller 1210 may select memory blocks, in which data received for a certain time period on the basis of the received reference time RT is stored, as target blocks.

In a step S1130, the memory controller 1120 (of FIG. 1) may perform a physical erase operation on a selected target block. In some embodiments, the physical erase operation indicates an operation to actually or physically erase data stored in actual memory cells rather than a logical erase operation to release a mapping relationship between a logical address of the host 1100 and a physical address of the nonvolatile memory device 1220. Alternatively or in addition, the physical erase operation indicates an operation to change threshold voltages of memory cells such that a threshold voltage of each memory cell is included in a threshold voltage distribution range of an erase state.

According to the above-described embodiments, the nonvolatile memory system 1200 (of FIG. 1) may select target blocks based on reception time of data and/or reference time RT, and may physically erase the selected target blocks. That is, since data received before reference time RT, or after reference time RT, or for a certain time period is completely eliminated in the nonvolatile memory device 1200, the nonvolatile memory system 1200 has improved security.

FIGS. 6 to 9 are drawings showing the operation method of FIG. 5. For brevity of description, components unnecessary to describe the operation of FIG. 5 are omitted. In addition, the nonvolatile memory device 1220 (of FIG. 1) may include first to third memory blocks BLK1 to BLK3. Each of the first to third memory blocks BLK1 to BLK3 may store four (4) page data. In addition, each of times T11 to T14, T21 to T24, and T31 to T34 may correspond to reception times of corresponding data received from the host 1100 (of FIG. 1) to the nonvolatile memory system 1220 (of FIG. 1). In addition, information on the times T11 to T14, T21 to T24, and T31 to T34 may be provided from the host 1100 together with the corresponding data. However, example embodiments of inventive concepts are not limited thereto.

Figure 6:
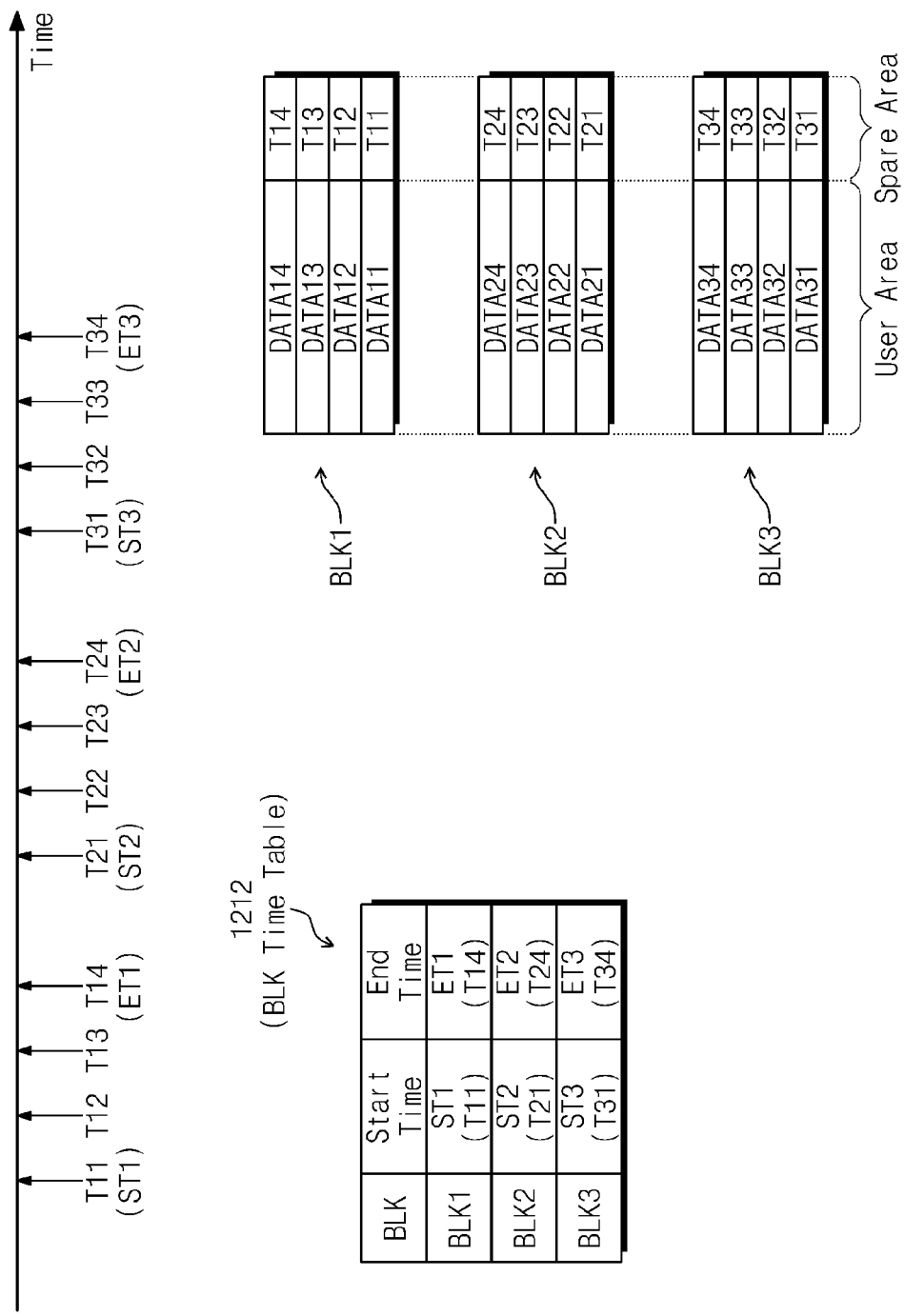
FIGS. 6 to 9 are drawings showing the operation method of FIG. 5.

Referring to FIGS. 1, 5, and 6, the nonvolatile memory system 1200 may receive data DATA11, DATA12, DATA13, and DATA14 between times T11 and T14. More specifically, the data DATA11 may be received at the time T11, the data DATA12 may be received at the time T12, the data DATA13 may be received at the time T13, and the data DATA14 may be received at the time T14. The data DATA11 to DATA14 received within a time between the times T11 and T14 may be stored in the first memory block BLK1. In some embodiments, the data DATA11 to DATA14 may be stored in a user area of the first memory block BLK1, and information on the corresponding reception times T11 to T14 may be stored in a spare area of a page in which corresponding data is stored. In an example embodiment, although not shown in the drawings, the spare area may include information such as an error correction code, a type, and/or a logical address of the data stored in the user area.

The memory controller 1210 may manage a start reception time and an end reception time of the first memory block BLK1 included in the block timetable 1212. For example, the first received data of the data DATA11 to DATA14 stored in the first memory block BLK1 is the data DATA11 received at the time T11, and the last received data may be the data DATA14 received at the time T14. In this case, the memory controller 1210 may manage the time T11 as start reception time ST1 of the first memory block BLK1, and manage the time T14 as end reception time ET1 of the first memory block BLK1. This means that data stored in the first memory block BLK1 is received between the times T11 and T14.

Similarly, the nonvolatile memory system 1200 may receive data DATA21, DATA22, DATA23, and DATA24 between times T21 to T24. The received data DATA21, DATA22, DATA23, and DATA24 may be stored in a user area of the second memory block BLK2, and the corresponding reception times T21 to T24 may be stored in a spare area of a page in which corresponding data is stored. The memory controller 1210 may manage the time T21 as start reception time ST2 of the second memory block BLK2, and manage the time T24 as end reception time ET2 of the second memory block BLK2. This means that data stored in the second memory block BLK2 is received between the times T21 to T24.

Similarly, data DATA31, DATA32, DATA33, and DATA34 received between times T31 to T34 may be stored in the third memory block BLK3. The received data DATA31, DATA32, DATA33, and DATA34 may be stored in a user area of the third memory block BLK3, and the corresponding reception times T31 to T34 may be stored in a spare area of a page in which corresponding data is stored. The memory controller 1210 may manage the time T31 as start reception time ST3 of the third memory block BLK3, and manage the time T34 as end reception time ET3 of the third memory block BLK3. This means that data stored in the third memory block BLK3 is received between the times T31 to T34.

Figure 7:
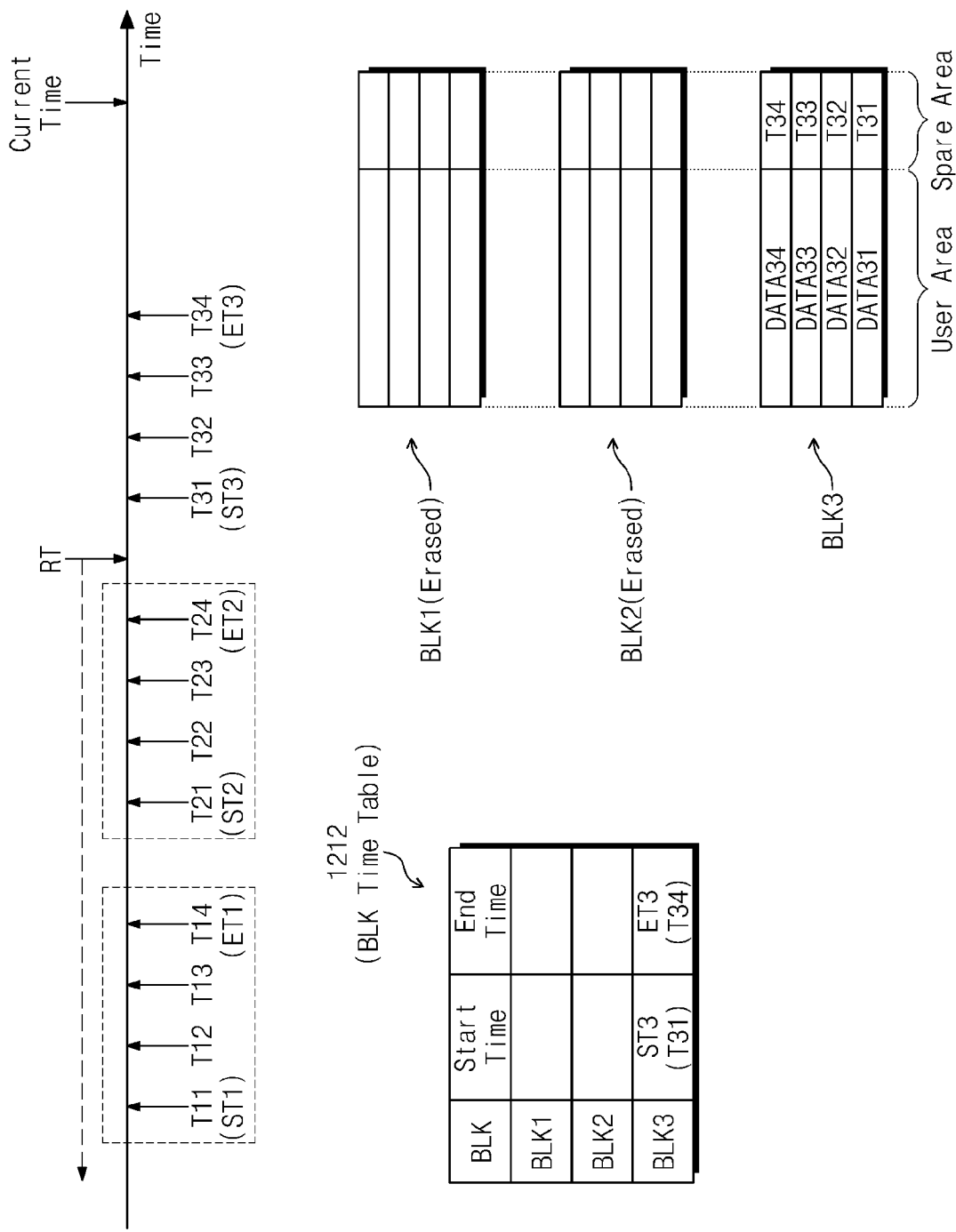

Next, an operation method for eliminating data received before reference time RT is described below with reference to FIG. 7. Referring to FIGS. 1, 5, 6, and 7, the nonvolatile memory system 1200 may receive a data elimination command CMD_de and reference time RT from the host 1100. The memory controller 1210 may select memory blocks in which data received before the received reference time RT is stored, based on the block timetable 1212, in response to the data elimination command CMD_de. For example, the reference time RT may be time between times T24 and T31, as shown in FIG. 7. In this case, the data DATA11 to DATA14 and data DATA21 to DATA24 stored in the first and second memory blocks BLK1 and BLK2 corresponds to data received before the reference time RT.

The memory controller 1210 may select the first and second memory blocks BLK1 and BLK2 as target blocks based on the block timetable 1212. For example, the memory controller 1210 may select memory blocks whose end reception times ET are ahead of the reference time RT as target blocks. In the case of the embodiment illustrated in FIG. 7, since end time times ET1 and ET2 of the first and second memory blocks BLK1 and BLK2 are ahead of the reference time RT, the first and second memory blocks BLK1 and BLK2 may be selected as target blocks.

The memory controller 1210 may perform an erase operation (i.e., a physical erase operation) on the selected target blocks (i.e., the first and second memory blocks BLK1 and BLK2). Memory cells included in the physically erased first and second memory blocks BLK1 and BLK2 may have an erased state. For example the memory cells in the physically erased first and second memory blocks BLK1 and BLK2 may have a threshold voltage of an erased state.

In some embodiments, after the first and second memory blocks BLK1 and BLK2 are physically erased, the memory controller 1210 may update the block timetable 1212. For example, after the first and second memory blocks BLK1 and BLK2 are physically erased, the memory controller 1210 may clear start reception times and end reception times ST1/ET1 and ST2/ET2 of each of the first and second memory blocks BLK1 and BLK2, respectively, included in the block timetable 1212.

Figure 8:
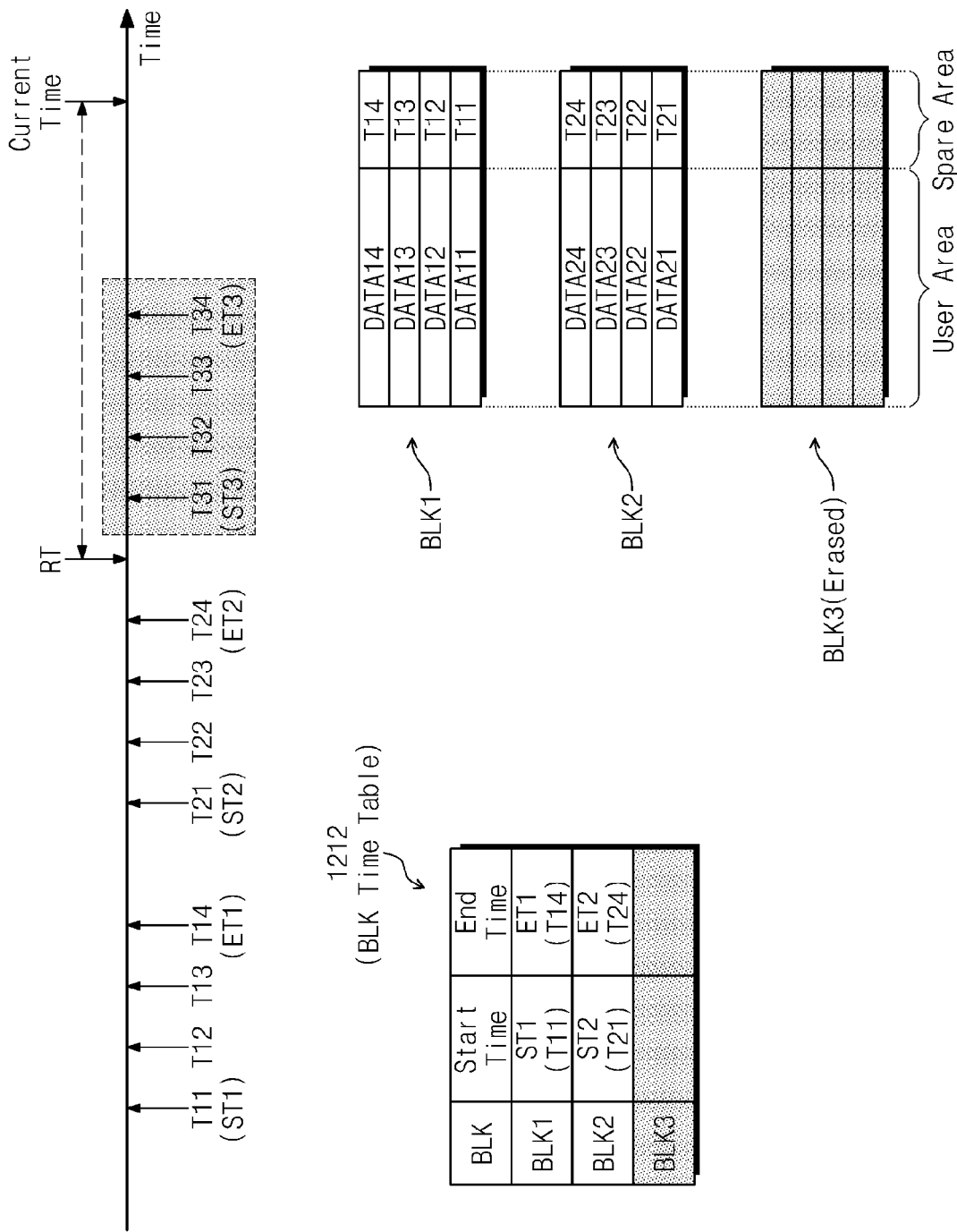

Next, an operation method for eliminating data received after reference time RT is described below with reference to FIG. 8. Referring to FIGS. 1, 5, 6, and 8, the nonvolatile memory system 1200 may receive a data elimination command CMD_de and reference time RT from the host 1100. The memory controller 1210 may select memory blocks in which data received after the received reference time RT is stored, based on the block timetable 1212, in response to the data elimination command CMD_de. Alternatively or in addition, the memory controller 1210 may select memory blocks in which data received between the received reference time RT and current time is stored, based on the block timetable 1212, in response to the data elimination command CMD_de.

For example, the reference time RT may be time between the times T24 and T31, as shown in FIG. 8. In this case, the data DATA31 to DATA34 stored in the third memory block BLK3 may be data received after the reference time RT, or between the reference time RT and the current time.

The memory controller 1210 may select the third memory block BLK3 as a target block based on the block timetable 1212. For example, the memory controller 1210 may select a memory block whose start reception time ST lags behind the reference time RT as a target block. In the case of the embodiments illustrated in FIG. 8, since the start reception time ST3 of the third memory block BLK3 lags behind the reference time RT, the third memory block BLK3 may be selected as a target block.

The memory controller 1210 may perform an erase operation (i.e., physical erase operation) on the selected third memory blocks BLK3. Memory cells included in the physically erase third memory blocks BLK3 may have an erased state. For example, the memory cells included in the physically erase third memory block BLK3 may have a threshold voltage of an erased state.

In some embodiments, after the third memory block BLK3 is physically erased, the memory controller 1210 may update the block timetable 1212. For example, after the third memory block BLK3 is physically erased, the memory controller 1210 may clear start reception time ST3 and end reception time ET3 of the third memory block BLK3 included in the block timetable 1212.

Figure 9:
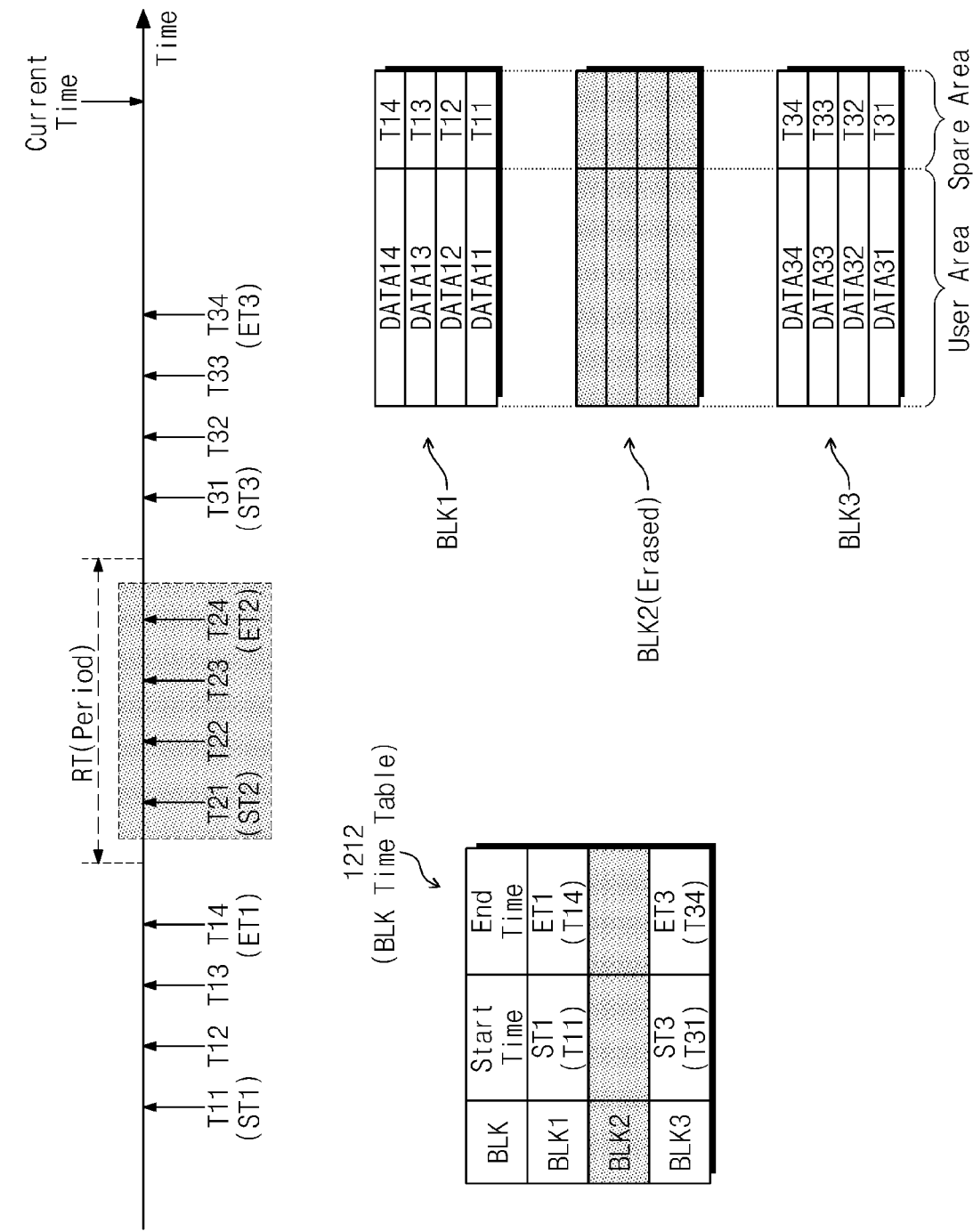

Next, an operation method for eliminating data received for a certain time period based on referenced time RT is described below with reference to FIG. 9. Referring to FIGS. 1, 5, 6, and 9, the nonvolatile memory device 1200 may receive a data elimination command CMD_de and a reference time period RT from the host 1100. In some embodiments, the reference time period RT may include period information on a certain time period.

The memory controller 1210 may select memory blocks in which data received for the reference time period RT is stored, based on the block timetable 1212, in response to the data elimination command CMD_de. For example, the reference time period RT may include a time period from the time T21 to the time T24. That is, the data DATA21 to DATA24 stored in the second memory block BLK2 may be data received for the reference time period RT.

The memory controller 1210 may select the second memory block BLK2 as a target block based on the block timetable 1212. For example, the memory controller 1210 may select a memory block whose start reception time ST and end reception time ET are included in the reference time RT, as a target block. In the case of the embodiment illustrated in FIG. 9, the memory controller 1210 may select the second memory block BLK2 as a target block based on the block timetable 1212.

The memory controller 1210 may perform an erase operation (i.e., physical erase operation) on the second memory block BLK2 selected as the target block. Memory cells of the physically erased memory block BLK2 may have an erased state. For example, the memory cells of the physically erased memory block BLK2 may have a threshold voltage of an erased state.

In some embodiments, the data elimination command CMD_de received from the host 1100 may include information on whether data received before the reference time RT is eliminated, data received after the reference time RT is eliminated, and/or data received within the reference time period RT is eliminated. The memory controller 1210 may perform an erase operation based on at least one of the foregoing conditions according to the information included in the data elimination command CMD_de.

In some embodiments, when first data is erased by the host 1100 and thus the nonvolatile memory system 1200 releases a mapping relationship of the first data (i.e., logically erases data), the first data may remain in the nonvolatile memory device 1220. In this case, since the first data exists in a memory block of the nonvolatile memory device 1220 even though the first data is logically erased, the block timetable 1212 may not be updated.

As described with reference to FIGS. 6 to 9, the nonvolatile memory system 1200 may physically erase data received before reference time RT, data received after the reference time RT, and/or data received for a certain time period depending on the reference time RT in response to a data elimination command CMD_de received from the host 1100. Thus, security of the nonvolatile memory system 1200 is improved.

Figure 10:
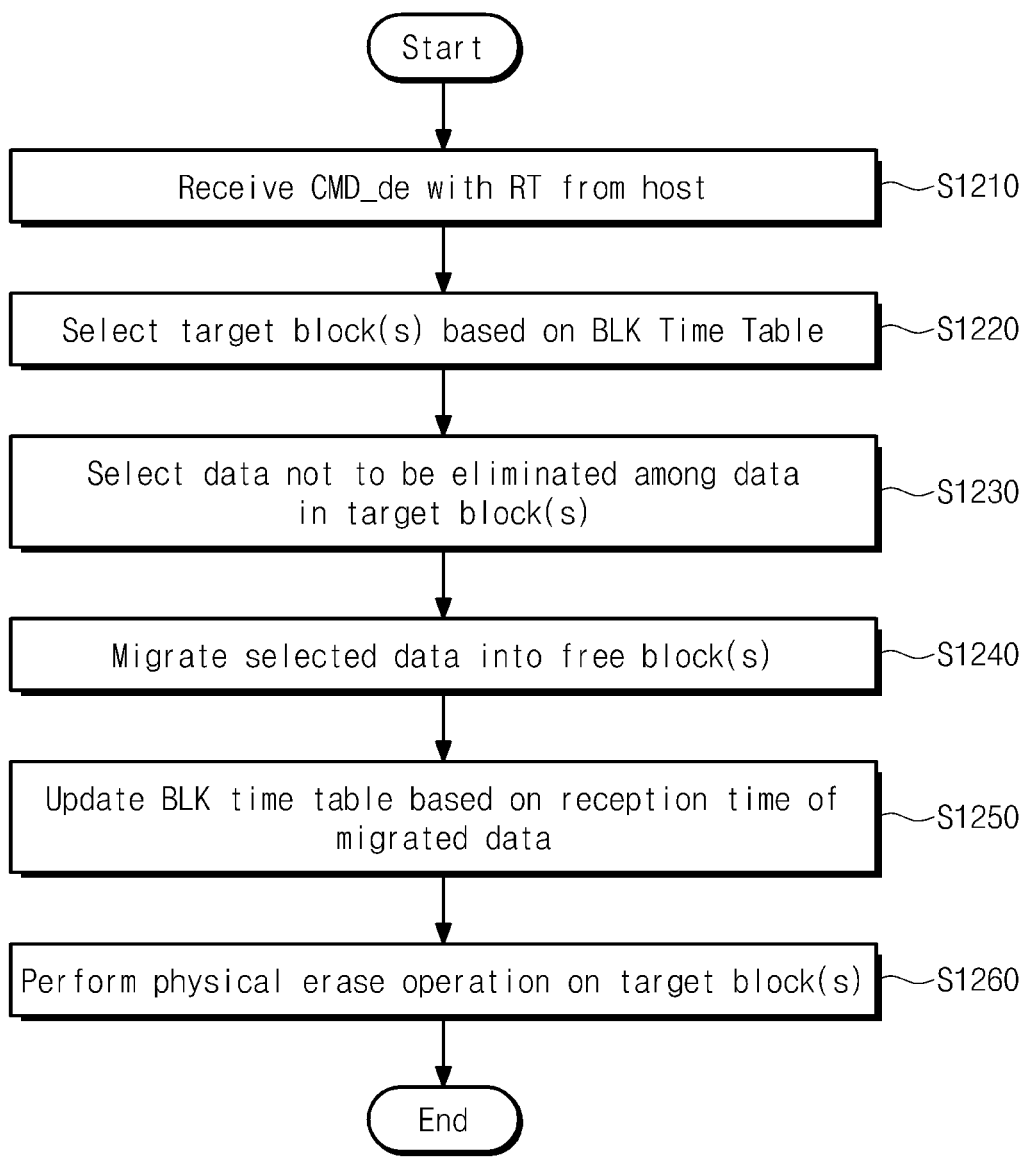
FIG. 10 is a flowchart showing an operation of a nonvolatile memory system according to example embodiments of inventive concepts.

FIG. 10 is a flowchart showing an operation of a nonvolatile memory system according to example embodiments of inventive concepts. Referring to FIGS. 1 and 10, in a step S1210, the nonvolatile memory system 1200 receives a data elimination command CMD_de and reference time RT from the host 1100. In a step S1220, the nonvolatile memory system 1200 selects target blocks based on the block timetable 1212. In some embodiments, since the steps S1210 and 1220 have been explained with reference to the operations S1110 and S1120 in FIG. 5 and FIGS. 6 to 9, their detailed explanations are not repeated.

In a step S1230, the nonvolatile memory system 1200 selects data not to be eliminated among data stored in the selected target blocks. For example, when the data received before the reference time RT is eliminated, the data received after the reference time RT among the data stored in the selected target blocks may exist. In this case, the data received after the reference time RT may not be eliminated. Alternatively or in addition, even though data is received before the reference time RT, important system files or metadata such as system data of the host 1100, data managed by the file system 1120, or metadata used in the nonvolatile memory system 1200 should not be eliminated. The nonvolatile memory system 1200 may select data not to be eliminated, as mentioned above. In some embodiments, the nonvolatile memory system 1200 may select valid data, among the data stored in the selected target block, as data not to be eliminated.

In a step S1240, the nonvolatile memory system 1200 may migrate the selected data into a free memory block. For example, the memory controller 1210 may read the selected data and store the read data in a free memory block included in the nonvolatile memory device 1220.

In a step S1250, the nonvolatile memory 1200 may update the block timetable 1212 based on reception time of the migrated data. For example, among data migrated to a first memory block (i.e., the free memory block), reception time of first received data may be first time and reception time of last received data may be second time. The memory controller 1210 may set start reception time ST of the first memory block of the block timetable 1212 as the first time and set end reception time ET of the first memory block of the block timetable 1212 as the second time.

In a step S1260, the nonvolatile memory system 1200 performs a physical erase operation on the selected target blocks. Since the step S1260 is identical to the operation S1130 in FIG. 5, its detailed description is not repeated. In some embodiments, after the target blocks are erased, the block timetable 1212 may be updated to initialize the start reception time ST and the end reception time ET.

Figure 11:
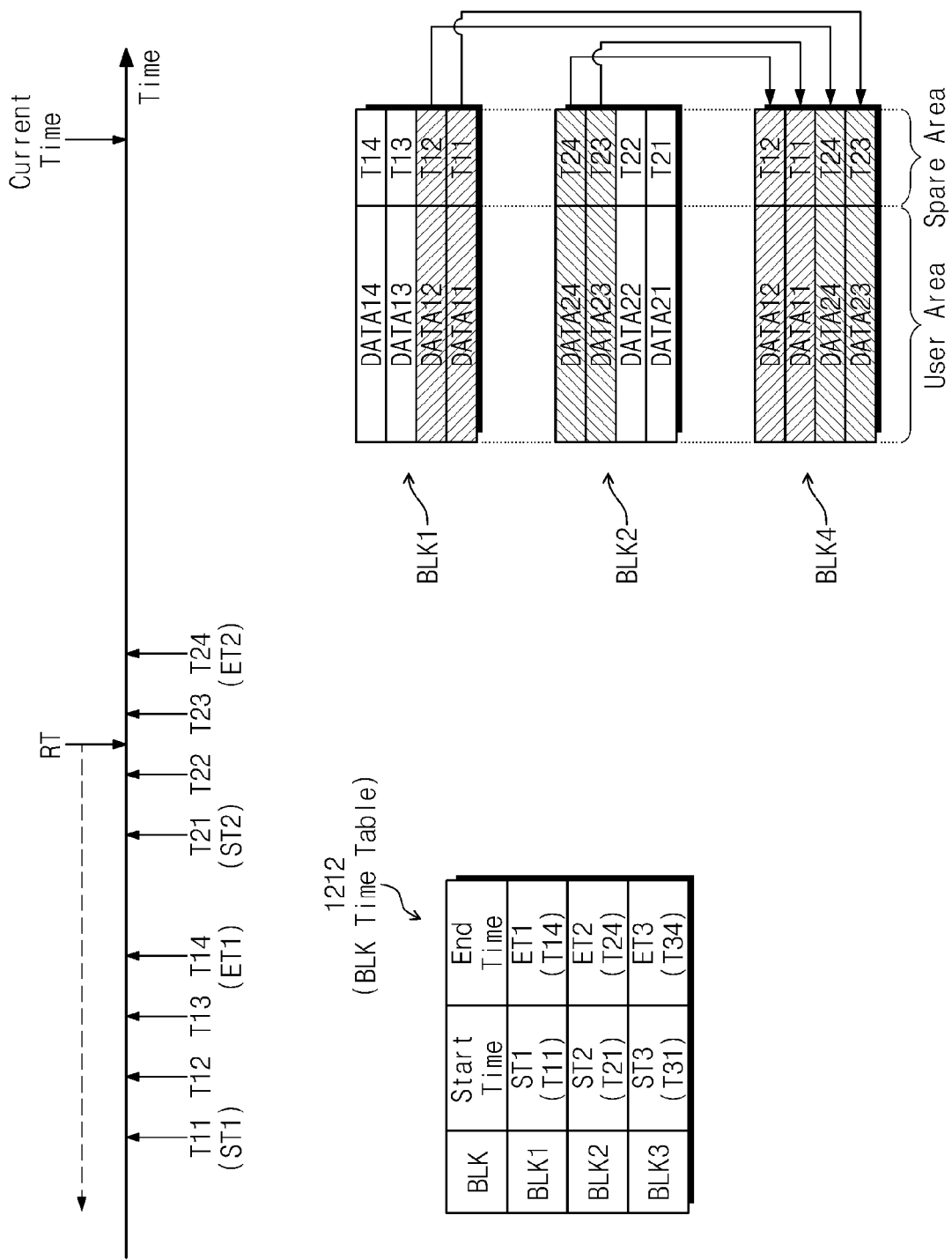
FIGS. 11 and 12 are drawings showing the operation method of FIG. 10.
Figure 12:
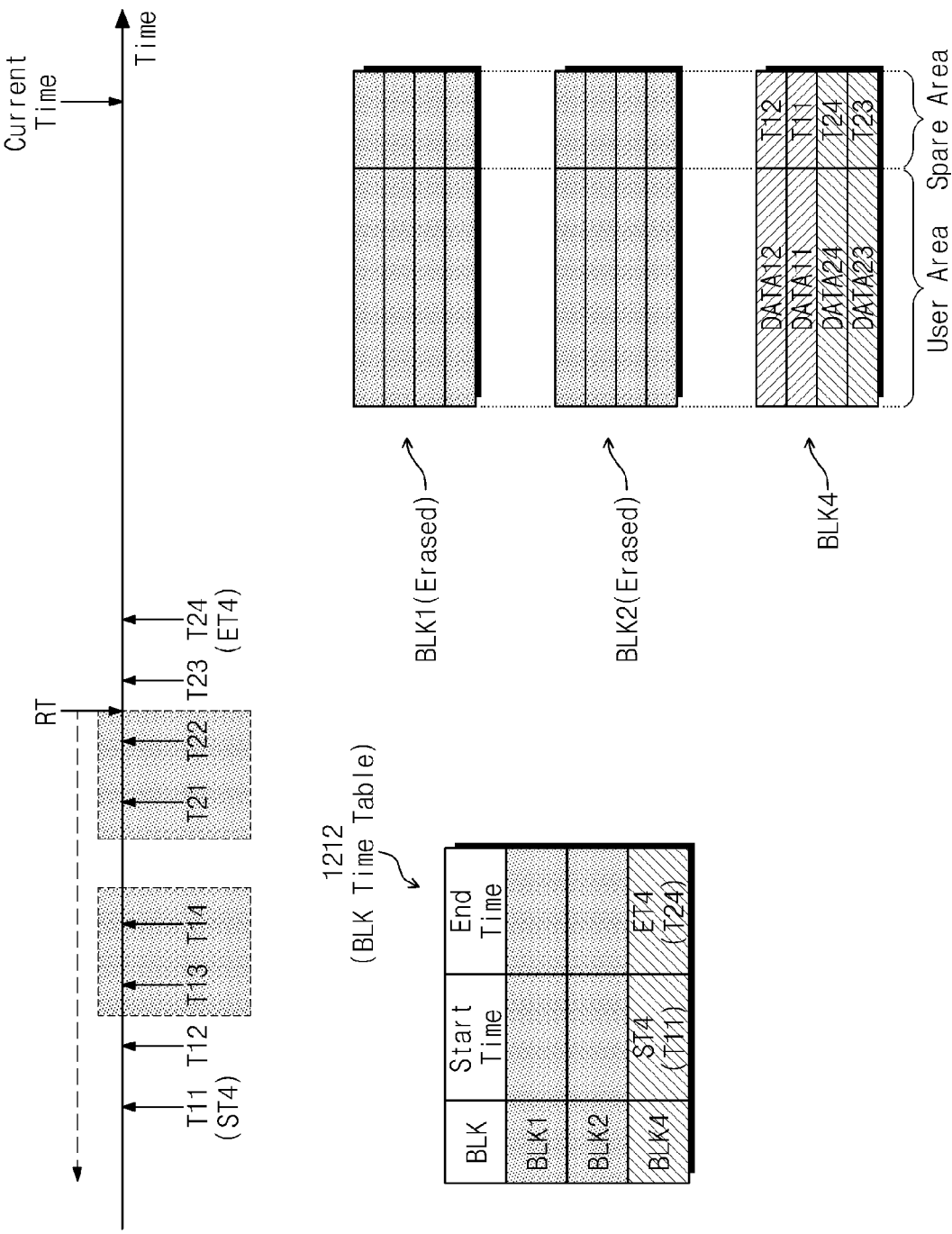

FIGS. 11 and 12 are drawings showing the operation method of FIG. 10. For brevity of description, components unnecessary to describe the operating method of FIG. 10 are omitted. Since reference numerals shown in FIG. 11 are similar to the reference numerals explained with reference to FIG. 6, their detailed explanations are not repeated. Although the embodiment described with reference to FIGS. 11 and 12 focuses on an eliminating operation of data received before reference time RT, example embodiments of inventive concepts are not limited thereto. That is, an operation method of selecting data not to be eliminated may similarly be applied to an eliminating operation of data received later than the reference time, or an eliminating operation of data received between reference time periods RT.

Referring to FIGS. 1, 10, and 11, the nonvolatile memory system 1200 may receive a data elimination command CMD_de and reference time RT from the host 1100. The reference time RT may be included between time T22 and time T23, as shown in FIG. 11. That is, the data received before the reference time RT may be data DATA11, DATA12, DATA13, DATA14, DATA21, and DATA22. In this case, the memory controller 1210 may select first and second blocks BLK1 and BLK2 as target blocks. In other words, the memory controller 1210 may select memory blocks whose start reception time ST lags behind the reference time RT as target memory blocks.

The memory controller 1210 may select data not to be eliminated among data stored in the first and second memory blocks BLK1 and BLK2 selected as the target blocks. For example, since data DATA23 and DATA24 of the second memory block BLK2 are received at the time T23 and time T24, which is later than the reference time RT, respectively, they may be selected as data not to be eliminated. In addition, data DATA11 and DATA12 of the first memory block BLK1 may be a system file of the host 1100, meta information managed by the file system 1120 (of FIG. 2) or meta information used in the nonvolatile memory system 1200. In this case, the data DATA11 and DATA12 of the first block BLK1 may be selected as data not to be eliminated. That is, the memory controller 1210 may select the data DATA11 and DATA12 of the first memory block BLK1 and the data DATA23 and DATA24 of the second memory block BLK2 as data not to be eliminated.

The memory controller 1210 may migrate (or copy) the selected data DATA11, DATA12, DATA23, and DATA24 to a free memory block such as fourth memory block BLK4. For example, the memory controller 1210 may sequentially read the data DATA11, DATA12, DATA23, and DATA24 and may sequentially program the read data into the fourth memory block BLK4. In some embodiments, reception time stored in a spare area may be migrated together. In some embodiments, although data is migrated to the free memory block, reception time corresponding to the migrated data may not be changed.

Next, referring to FIGS. 1, 10, and 12, the memory controller 1210 may perform a physical erase operation on the first and second memory blocks BLK1 and BLK2 after the selected data (i.e., data not to be eliminated) is migrated into the fourth memory block BLK4. The physically erased first and second memory blocks BLK1 and BLK2 may subsequently be used as free memory blocks.

The memory controller 1210 may update the block timetable 1212 after the first and second memory blocks BLK1 and BLK2 are physically erased. For example, the memory controller 1210 may release start reception times ST1 and ST2 and end reception times ET1 and ET2 of the physically erased first and second memory blocks BLK1 and BLK2. The memory controller 1210 may set start reception time ST4 of the fourth memory block BLK4 as time T11, and set end reception time ET4 of the fourth memory block BLK4 as time ET24.

According to the example embodiment described with reference to FIGS. 10 to 12, the nonvolatile memory system 1200 may select target blocks based on the block timetable 1212 and perform a physical erase operation on the selected target blocks. At this point, the nonvolatile memory system 1200 may select data that does not meet an elimination condition or data that is not an elimination target, and may migrate the selected data to a free block. Thus, data such as system information or meta information may be protected to normally operate the user system 1000 and provide a nonvolatile memory system with improved security.

Figure 13:
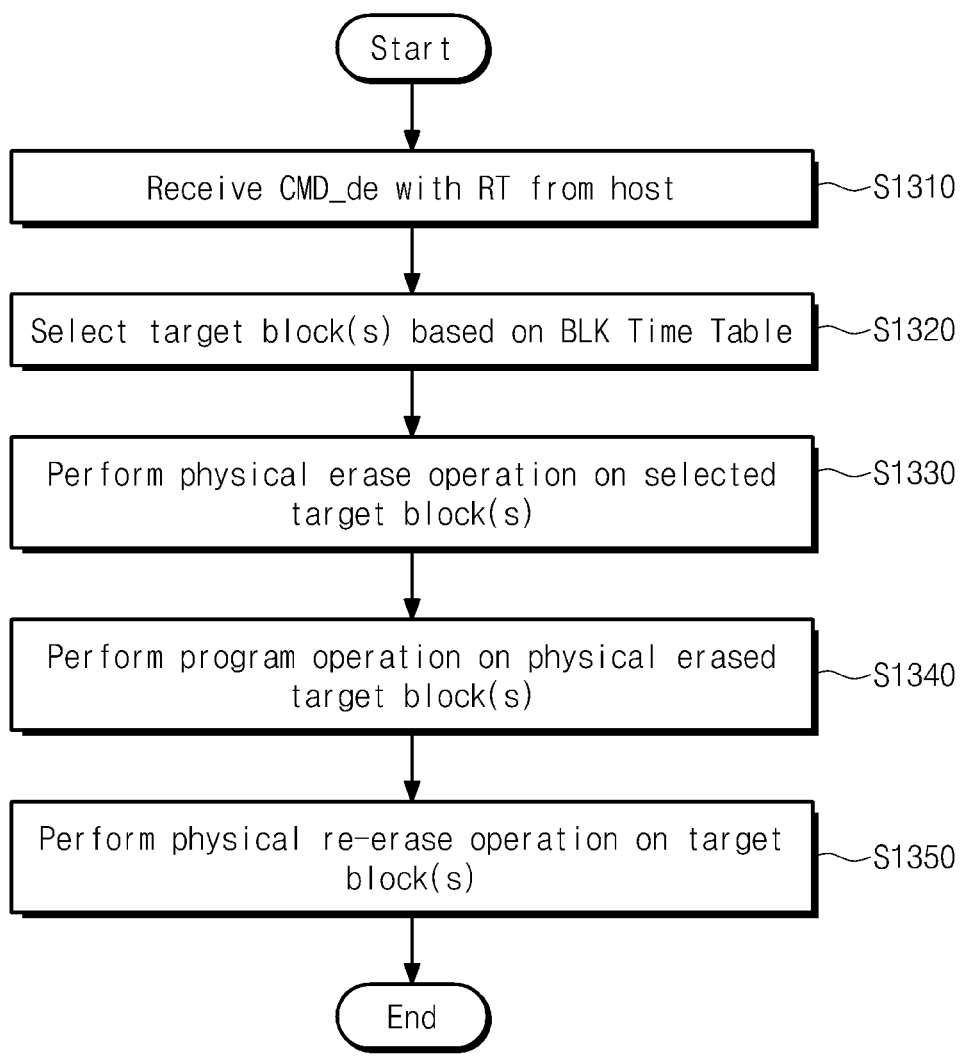
FIG. 13 is a flowchart showing the operation of a nonvolatile memory system according to example embodiments of inventive concepts.
Figure 14:
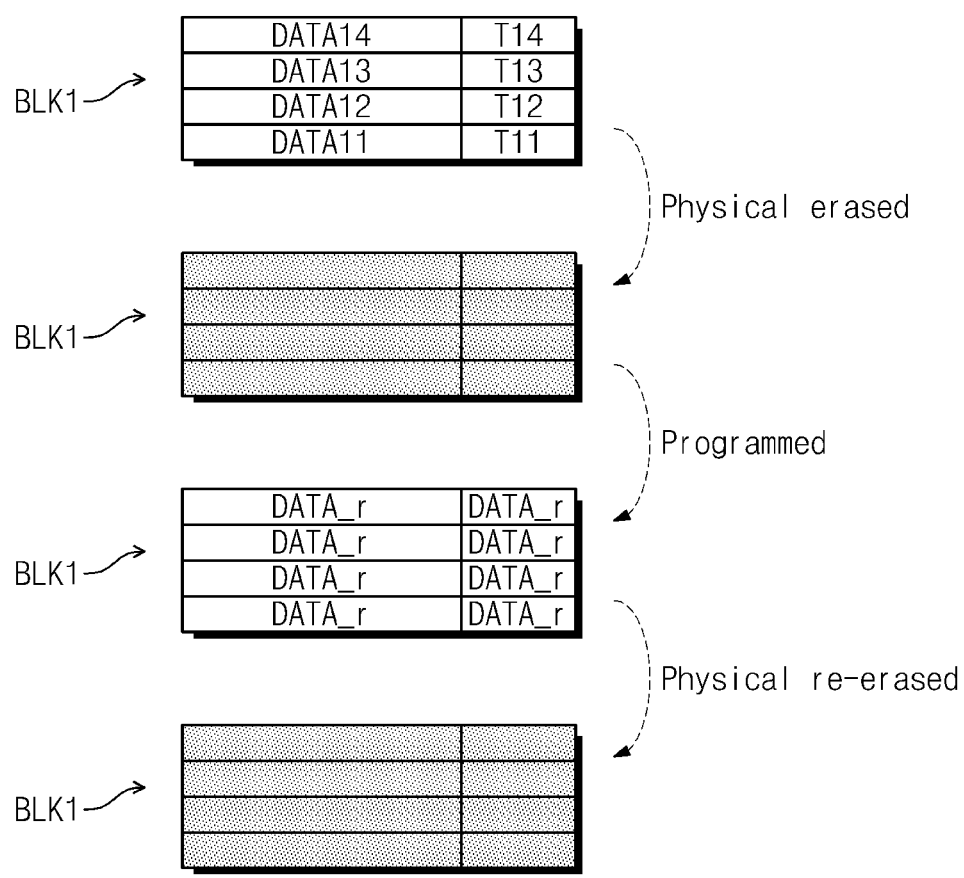
FIG. 14 is a drawing showing the operation method of FIG. 13.

FIG. 13 is a flowchart showing the operation of a nonvolatile memory system according to example embodiments of inventive concepts. FIG. 14 is a drawing showing the operation method of FIG. 13. Referring to FIGS. 1, 13, and 14, the nonvolatile memory system 1200 may perform steps S1310 to S1330. Since the steps S1310 to S1330 are identical to the steps S1110 to S1130 in FIG. 5, their detailed explanations are not repeated.

In a step S1340, the nonvolatile memory system 1200 may perform a program operation on a physically erased target block. For example, the nonvolatile memory system 1200 may program data such as random data, data having a specific pattern, dummy data, and/or user data into a physically erased target block. In some embodiments, the nonvolatile memory system 1200 may perform a program operation on a partial area or a specific area of the physically erased target block. In more detailed example embodiments, a first memory block may be a memory block selected as a target block and may be physically erased, as shown in FIG. 14. Then, the first memory block BLK1 may be programmed with random data DATA_r. In some embodiments, the random data DATA_r may include data such as random pattern data, specific pattern data, security pattern data, all-zero data, or the like.

In a step S1350, the nonvolatile memory system 1200 may re-perform a physically erase operation on the target block (i.e., the first memory block BLK1 in which the random data is programmed). For example, the nonvolatile memory system 1200 may physically re-erase the first memory block BLK1 programmed with the random data DATA_r. In some embodiments, the nonvolatile memory system 1200 may repeatedly perform the steps S1340 to S1350 a predetermined number of times.

According to the above-described example embodiment, erase and program operations may be repeatedly performed on a target block to fully eliminate data stored in the target block. For example, when the target block is physically erased once, there is a probability that the data is recovered based on a threshold voltage and/or cell characteristics of memory cells of the target block through a separate data recovery device or recovery algorithm. However, if physical erase and program operations are repeatedly performed on the target block, data of the target block cannot be recovered. Thus, security of the nonvolatile memory system described herein is improved.

Figure 15:
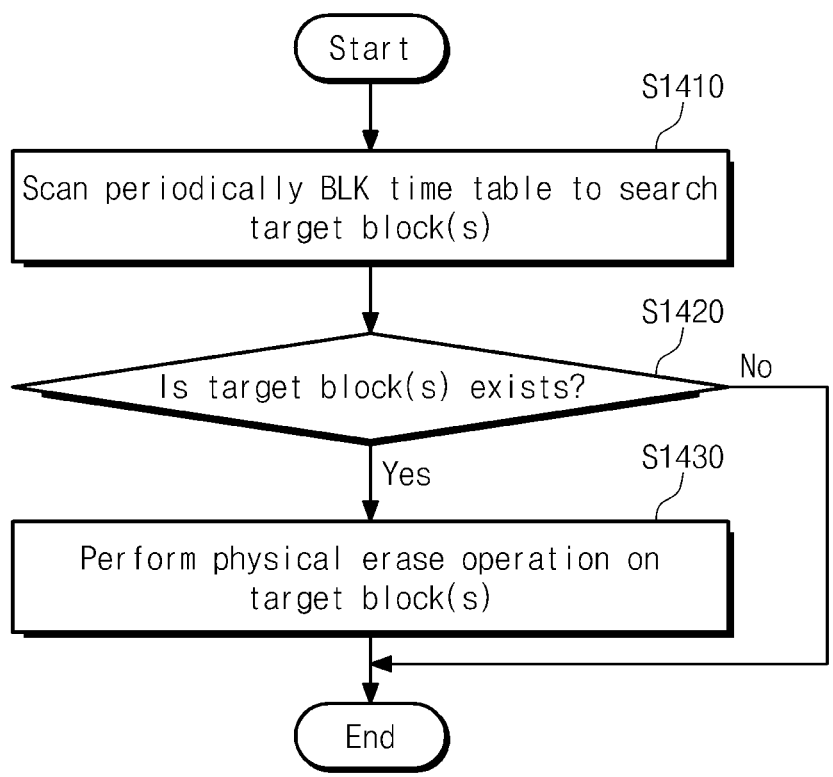
FIG. 15 is a flowchart showing an operation of a nonvolatile memory system according to example embodiments of inventive concepts.

FIG. 15 is a flowchart showing an operation of a nonvolatile memory system according to example embodiments of inventive concepts. Referring to FIGS. 1 and 15, in a step S1410, the nonvolatile memory system 1200 may scan the block timetable 1212 to search a target block. For example, the nonvolatile memory system 1200 may periodically search the block timetable 1212 to search memory blocks in which reception time of stored data passes a predetermined time. In some embodiments, the nonvolatile memory system 1200 may scan the block timetable 1212 based on the data elimination conditions described with reference to FIGS. 5 to 9 to search a target block. In some embodiments, the nonvolatile memory system 1200 may scan the block timetable 1212 for idle time. In some embodiments, the nonvolatile memory system 1200 may perform operation S1410 without receiving a separate command or request from the host 1100.

In a step S1420, the nonvolatile memory system 1200 determines whether a target block exists. When the target block exists, the flow proceeds to a step S1430 in which the nonvolatile memory system 1200 performs a physical erase operation on the target block. When the target block does not exist, the nonvolatile memory system 1200 does not perform an addition operation for eliminating data.

According to the above-describe example embodiments, the nonvolatile memory system 1200 may periodically scan the block timetable 1212 without receiving a command or request from the host 1100 to select a target block, and may perform a physical erase operation on the selected target block. Thus, security of the nonvolatile memory system as described herein is improved.

Figure 16:
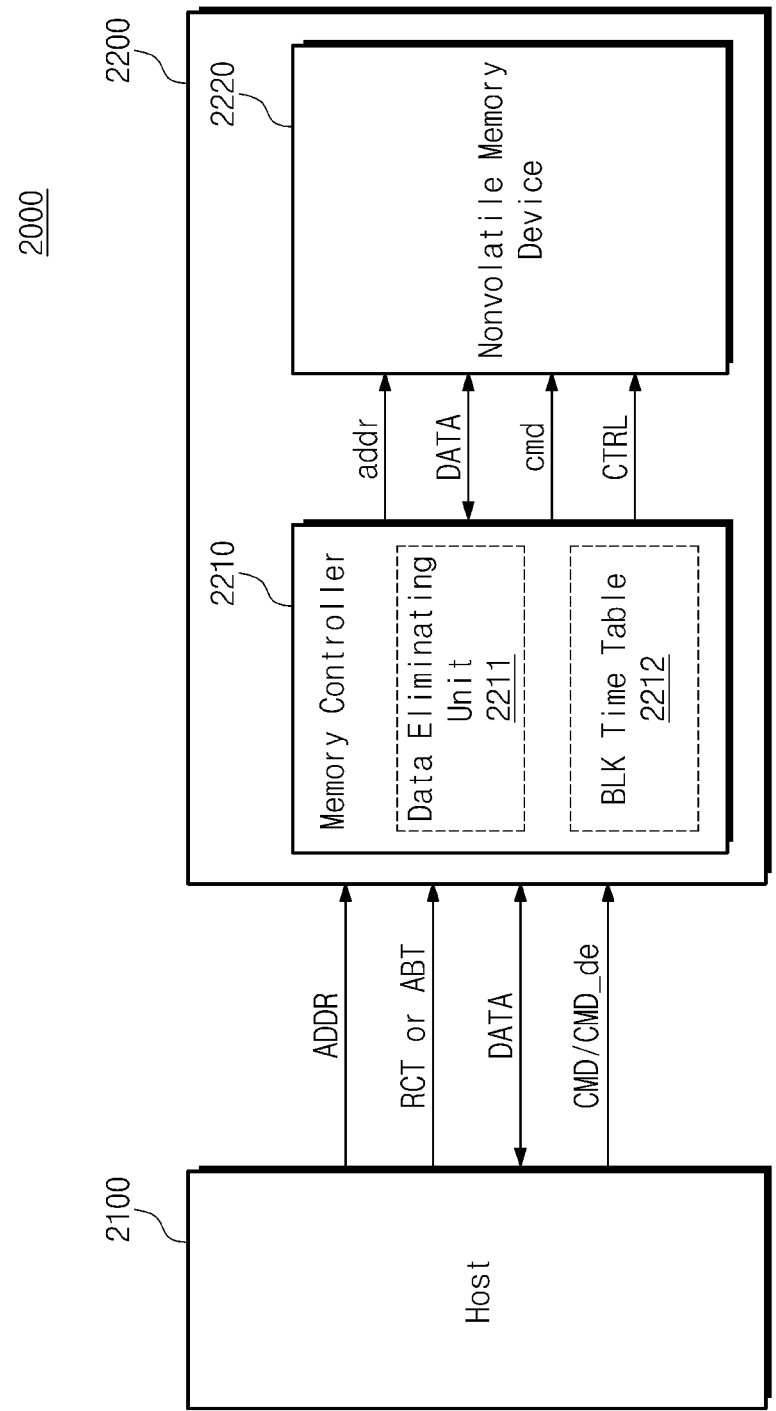
FIG. 16 is an example block diagram of a user system according to example embodiments of inventive concepts.

FIG. 16 is an example block diagram of a user system 2000 according to example embodiments of inventive concepts. Referring to FIG. 16, the user system 2000 includes a host 2100 and a nonvolatile memory system 2200. The nonvolatile memory system 2200 includes a memory controller 2210 and a nonvolatile memory device 2220. The memory controller 2210 includes a data eliminating unit 2211 and a block timetable 2212.

Since the host 2100, the nonvolatile memory system 2200, the memory controller 2210, the nonvolatile memory device 2220, the data eliminating unit 2211, and the block timetable 2212 have been explained with reference to FIGS. 1 to 15, their detailed explanation are not repeated.

The host 2100 may transmit reception time RCT or absolute time ABT to the nonvolatile memory system 2200. The nonvolatile memory system 2200 may update the block timetable 2212 based on the received reception time RCT or absolute time ABT. For example, the memory controller 2210 may receive the reception time RCT and data DATA from the host 2100, and store the received data DATA in the nonvolatile memory device 2220. The memory controller 2210 may update information on a memory block in which the data DATA is stored, based on the received reception time RCT, at the block timetable 2212. Alternatively or in addition, the memory controller 2210 may periodically receive the absolute time ABT from the host 2100, and update the block timetable 2212 based on the received absolute time ABT. In some embodiments, the reception time RCT and the absolute time ABT may indicate information on reception time and absolute time, respectively.

Hereinafter, a management method of the block timetable 2212 is described below with reference to the drawings.

Figure 17:
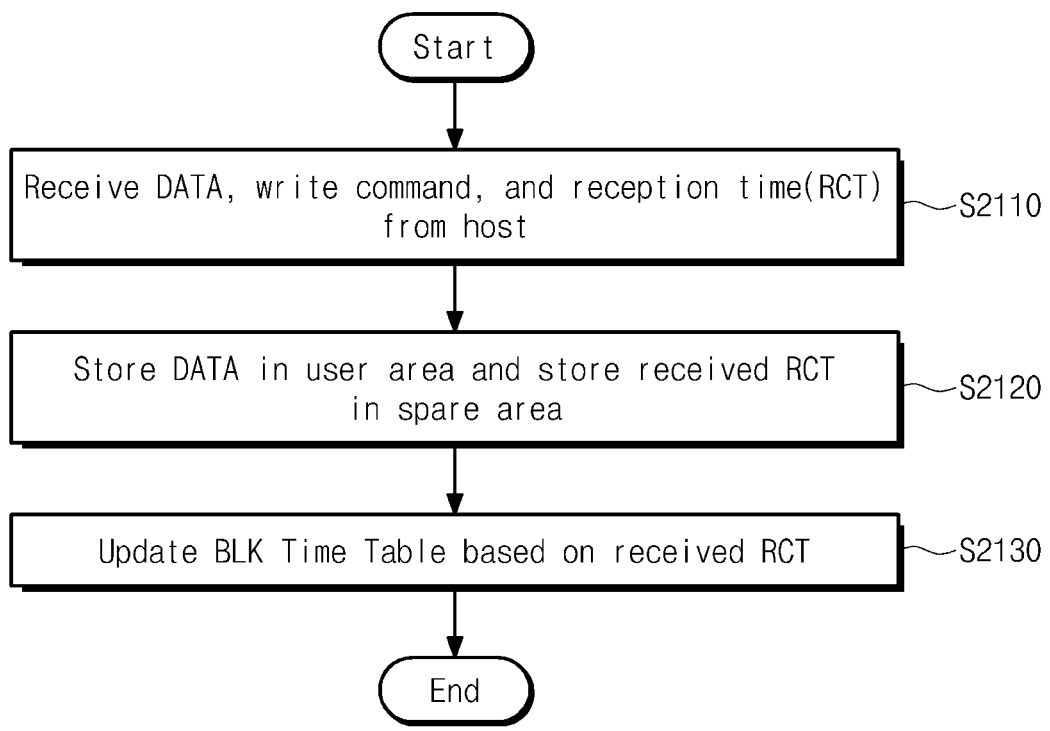
FIG. 17 is a flowchart showing an operation of a nonvolatile memory system of FIG. 16.
Figure 18:
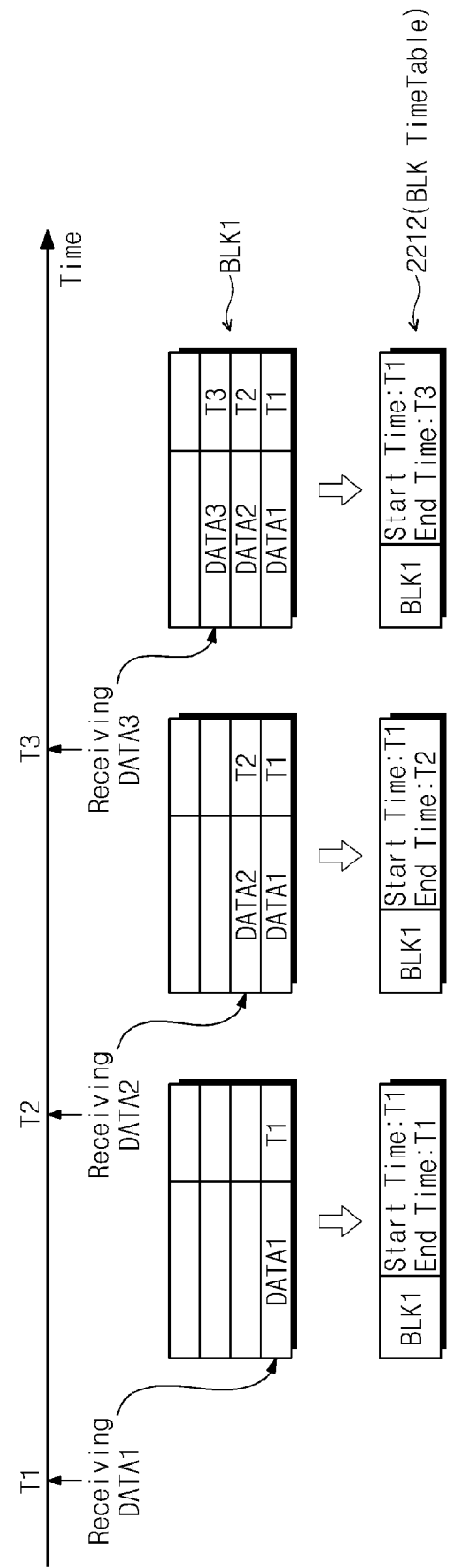
FIGS. 18 and 19 are drawings showing the operation method of FIG. 17.
Figure 19:
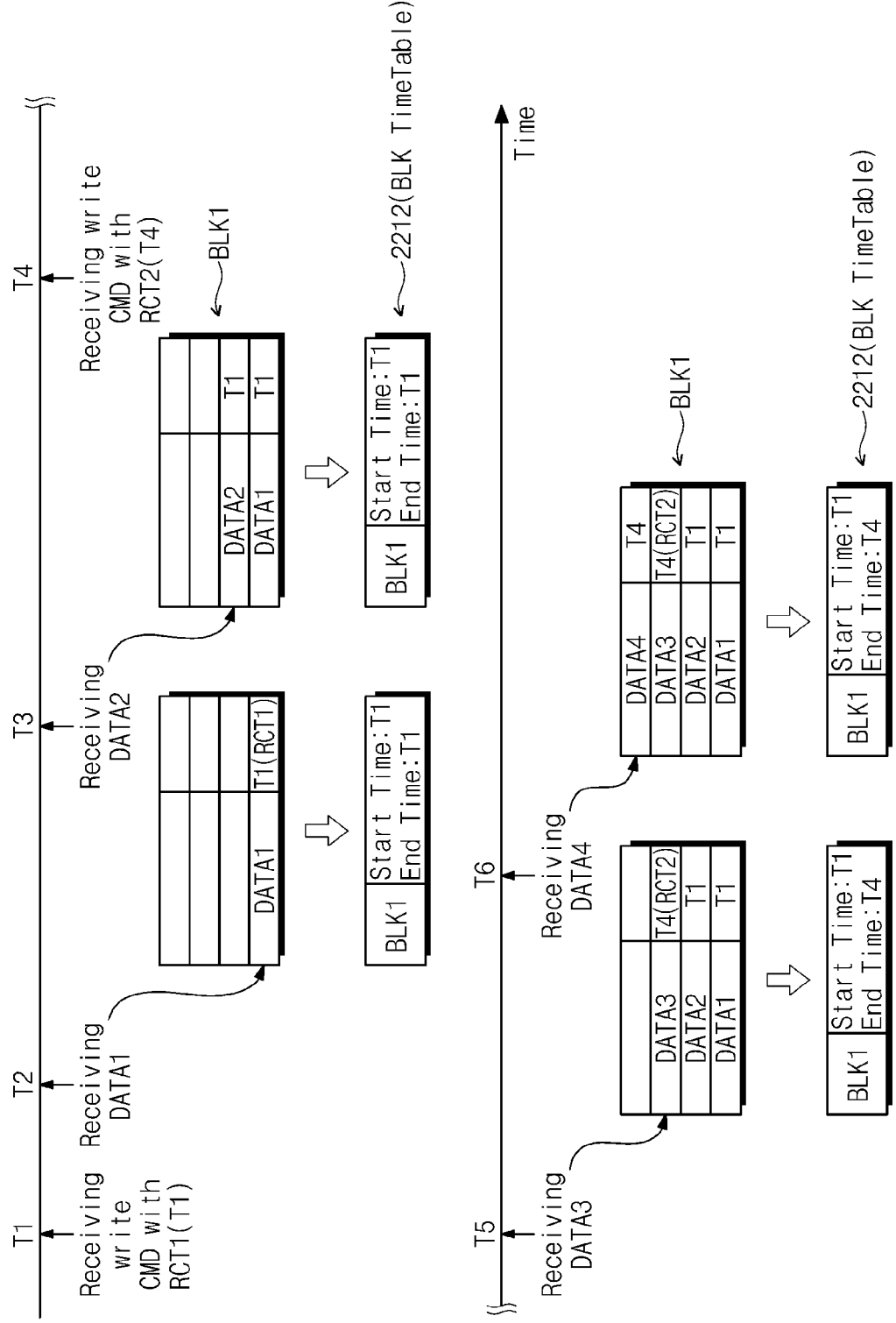

FIG. 17 is a flowchart showing an operation of a nonvolatile memory system of FIG. 16. FIGS. 18 and 19 are drawings showing the operating method of FIG. 17. Referring to FIGS. 16 and 17, in a step S2110, the nonvolatile memory system 2200 receives data DATA, a write command, and/or reception time RCT from the host 2100. In some embodiments, the reception time RCT may be included in a spare area of the write command. Alternatively or in addition, the reception time RCT may be included in the data DATA. Alternatively or in addition, the reception time RCT may be included in each of a plurality of data sectors. The reception time RCT may be relative time defined by the host 2100 or absolute time managed by the host 2100.

In a step S2120, the nonvolatile memory system 2200 may store the received data DATA in a user area and the received reception time RCT in a spare area. In some embodiments, the reception time RCT corresponding to the received data DATA may be stored in a spare area of a page in which the received data DATA is stored.

In a step S2130, the nonvolatile memory system 2200 updates the block timetable 2212 based on the received reception time RCT. For example, the nonvolatile memory system 2200 may update end reception time ET of a memory block in which the data DATA is stored, at the block timetable 2212, as received reception time RCT.

The operation method in FIG. 17 is described in further detail below with reference to FIG. 18. Referring to FIGS. 16 to 18, the nonvolatile memory system 2200 may receive first data DATA1 from the host 2100 at first time T1. The nonvolatile memory system 2200 may write the received first data DATA1 into a user area of a first memory block BLK1. In some embodiments, the nonvolatile memory system 2200 may receive information on the first time T1 as reception time RCT together with the first data DATA1. The nonvolatile memory system 2200 may store the received reception time RCT (i.e., the first time T1) in a spare area of the first memory block BLK1. After storing the first data DATA1 in the first memory block BLK1, the nonvolatile memory system 2200 may update start reception time ST and end reception time ET of the first memory block BLK1 at the block timetable 2212 to the first time T1.

Next, the nonvolatile memory system 2200 may receive second data DATA2 at second time T2. The nonvolatile memory system 2200 may store the second data DATA2 in the user area of the first memory block BLK1. Similarly, the nonvolatile memory system 2200 may receive information on the second time T2 from the host 2100 as reception time RCT together with the second data DATA2. The nonvolatile memory system 2200 may store information on the second time T2 in the spare area of the first memory block BLK1. After storing the second data DATA2 in the first memory block BLK1, the nonvolatile memory system 2200 may update the end reception time ET of the first memory block BLK1 at the block timetable 2212 to the second time T2. This means that data received between the first time T1 and the second time T2 is stored in the first memory block BLK1.

Next, the nonvolatile memory system 2200 may receive third data DATA3 at third time T3. The nonvolatile memory system 2200 may store the third data DATA3 in the user area of the first memory block BLK1. Similarly, the nonvolatile memory system 2200 may receive information on the third time T3 from the host 2100 as reception time RCT together with the third data DATA3. The nonvolatile memory system 2200 may store information on the third time T3 in the spare area of the first memory block BLK1. After storing the third data DATA3 in the first memory block BLK1, the nonvolatile memory system 2200 may update the end reception time ET of the first memory block BLK1 at the block timetable 2212 to the third time T3. This means that data received between the third time T1 and the third time T3 is stored in the first memory block BLK1.

As mentioned above, whenever receiving data from the host 2100, the nonvolatile memory system 2200 may receive the reception time RCT from the host 2100 and update the block timetable 2212 based on the received reception time RCT. The nonvolatile memory system 2200 may perform the operations described with reference to FIGS. 1 to 15 based on the block timetable 2212.

Next, referring to FIGS. 16, 17, and 19, the nonvolatile memory system 2200 may receive information on first reception time RCT1 from the host 2100 together with a write command at the first time T1. In some embodiments, the information on the first reception time RCT1 may be information on the first time T1 and may be included in the write command.

Then, the nonvolatile memory system 2200 may receive the first and second data DATA1 and DATA2 at the second and third times T2 and T3, respectively. In some embodiments, each of the first and second data DATA1 and DATA2 may be data on the write command received at the first time T1. The nonvolatile memory system 2200 may store the first and second data DATA1 and DATA2 in the first memory block BLK1. In this case, the nonvolatile memory system 2200 may write information on the first reception time RCT1 (i.e., the first time T1) into the spare area of the first memory block BLK1.

In some embodiments, after storing the first and second data DATA1 and DATA2 in the first memory block BLK1, the nonvolatile memory system 2200 may update the block timetable 2212. For example, the nonvolatile memory system 2200 may set the start reception time ST and the end reception time ET as the first time T1 (i.e., the first reception time RCT1) at the block timetable 2212.

Next, at fourth time T4, the nonvolatile memory system 2200 may receive information on second reception time RCT2 from the host 2100 together with the write command. In some embodiments, the information on the second reception time RCT2 may be information on the fourth time T4 and may be included in the write command.

Then the nonvolatile memory system 2200 may receive the third and fourth data DATA3 and DATA4 at fifth and sixth times T5 and T6, respectively. In some embodiments, each of the third and fourth data DATA3 and DATA4 may be data on the write command received at the fourth time T4. The nonvolatile memory system 2200 may store the third and fourth data DATA3 and DATA4 in the first memory block BLK1. In this case, the nonvolatile memory system 2200 may write information on the second reception time RCT2 (i.e., the fourth time T4) in the spare area of the first memory block BLK1.

In some embodiments, after storing the first and second data DATA1 and DATA2 in the first memory block BLK1, the nonvolatile memory system 2200 may update the block timetable 2212. For example, the nonvolatile memory system 2200 may update the end reception time ET of the first memory block BLK1 to the fourth time T4 (i.e., the second reception time RCT2) at the block timetable 2212.

As described above, the nonvolatile memory system 2200 may receive information on reception time from the host 2100 together with a write command. The nonvolatile memory system 2200 may update the block timetable 2212 based on the received reception time. The nonvolatile memory system 2200 may perform the operations described with reference to FIGS. 1 to 15 based on the block timetable 2212.

Figure 20:
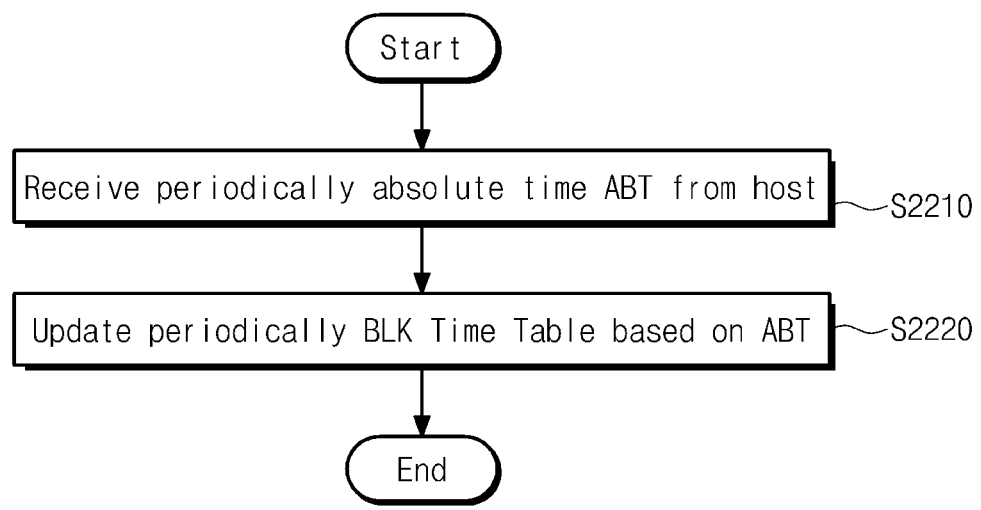
FIG. 20 is a flowchart showing another operation of the nonvolatile memory system of FIG. 16.
Figure 21:
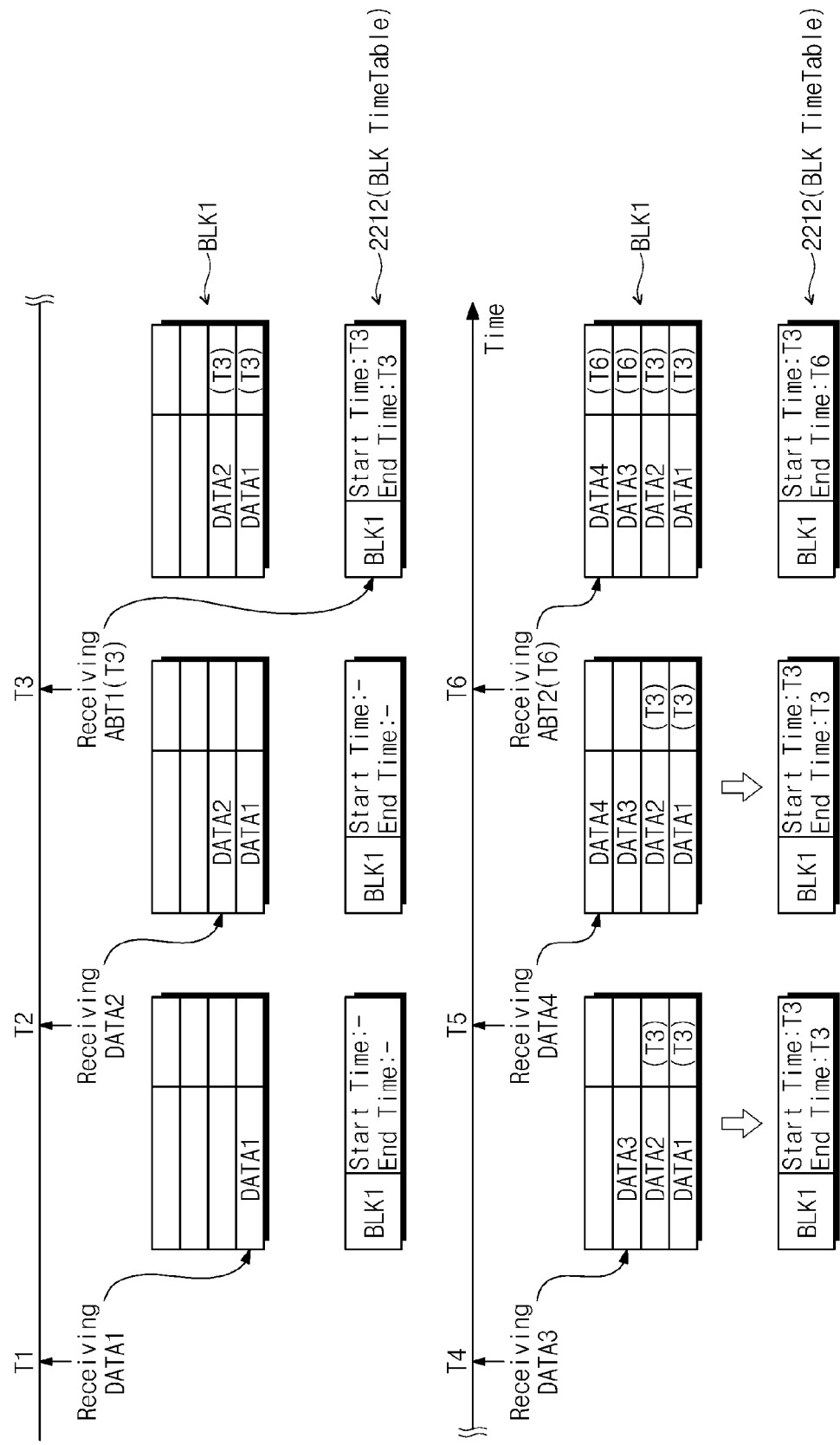
FIG. 21 is a drawing showing the operation of FIG. 20.

FIG. 20 is a flowchart showing another operation of the nonvolatile memory system of FIG. 16. FIG. 21 is a drawing showing the operation in FIG. 20. Referring to FIGS. 16, 20, and 21, in a step S2210, the nonvolatile memory system 2200 periodically receives information on absolute time ABT from the host 2100. In some embodiments, the absolute time ABT indicates time managed or defined by the host 2100. The nonvolatile memory system 2200 may receive the absolute time ABT from the host 2100 through a predefined command, a reserved command, a vendor command or a combination of commands. Alternatively or in addition, the nonvolatile memory system 2200 may receive the absolute time ABT from the host 2100 through separate signals.

In a step S2220, the nonvolatile memory system 2200 may periodically update the block timetable 2212 based on the received absolute time ABT. For example, the nonvolatile memory system 2200 may update start reception time and end reception time of blocks in which data received between previously received absolute time and currently received absolute time ABT are stored, based on the absolute time ABT.

In more detailed example embodiments, as shown in FIG. 21, the nonvolatile memory system 2200 may receive first and second data DATA1 and DATA2 at first and second times T1 and T2, respectively. The nonvolatile memory system 2200 may store the received first and second data DATA1 and DATA2 in the first memory block BLK1.

Then the nonvolatile memory system 2200 may receive information on first absolute time ABT1 from the host 2100 at third time T3. The information on the first absolute time ABT1 may be information on the third time T3. The nonvolatile memory system 2200 may update the block timetable 2212 based on information on the received first absolute time ABT1. That is, the first and second data DATA1 and DATA2 stored in the first memory block BLK1 may not include information on reception time. After receiving the first absolute time ABT1, the nonvolatile memory system 2200 may set reception time of data that does not include information on reception time as the first absolute time ABT1. In some embodiments, information on the third time T3 (i.e., the first absolute time ABT1) may be stored in the spare area of the first memory block BLK1. The nonvolatile memory system 2200 may update start reception time and end reception time of the first memory block BLK included in the block timetable 2212 to the third time T3 (i.e., the first absolute time ABT1).

Then the nonvolatile memory system 2200 may receive third and fourth data DATA3 and DATA4 at fourth and fifth times T4 and T5, respectively. The nonvolatile memory system 2200 may store the received third and fourth data DATA3 and DATA4 in the first memory block BLK1.

Then the nonvolatile memory system 2200 may receive information on second absolute time ABT2 from the host 2100 at sixth time T6. The information on the second absolute time ABT2 may be information on the sixth time T6. The nonvolatile memory system 2200 may update the block timetable 2212 based on the received information on the second absolute time ABT2. That is, the third and fourth data DATA3 and DATA4 stored in the first memory block BLK1 may not include information on reception time. After receiving the second absolute time ABT2, the nonvolatile memory system 2200 may set reception time of data that does not include reception time as the second absolute time ABT2. In some embodiments, the information on the sixth time T6 (i.e., the second absolute time ABT2) may be stored in the spare area of the first memory block BLK1. The nonvolatile memory system 2200 may update the end reception time of the first memory block BLK1 included in the block timetable 2212 to the sixth time T6 (i.e., the second absolute time ABT2).

According to the above-described example embodiments, the nonvolatile memory system 2200 receive information on reception time RCT and/or absolute time ABT from the host 2100 and update the block timetable 2212 based on the received reception time RCT and/or absolute time ABT. In this case, the reception time RCT may be received together with a write command or data, and the absolute time ABT may be periodically received from the host 2100. In some embodiments, the nonvolatile memory system 2200 may perform the operations described with reference to FIGS. 1 to 15 based on the block timetable 2212.

Figure 22:
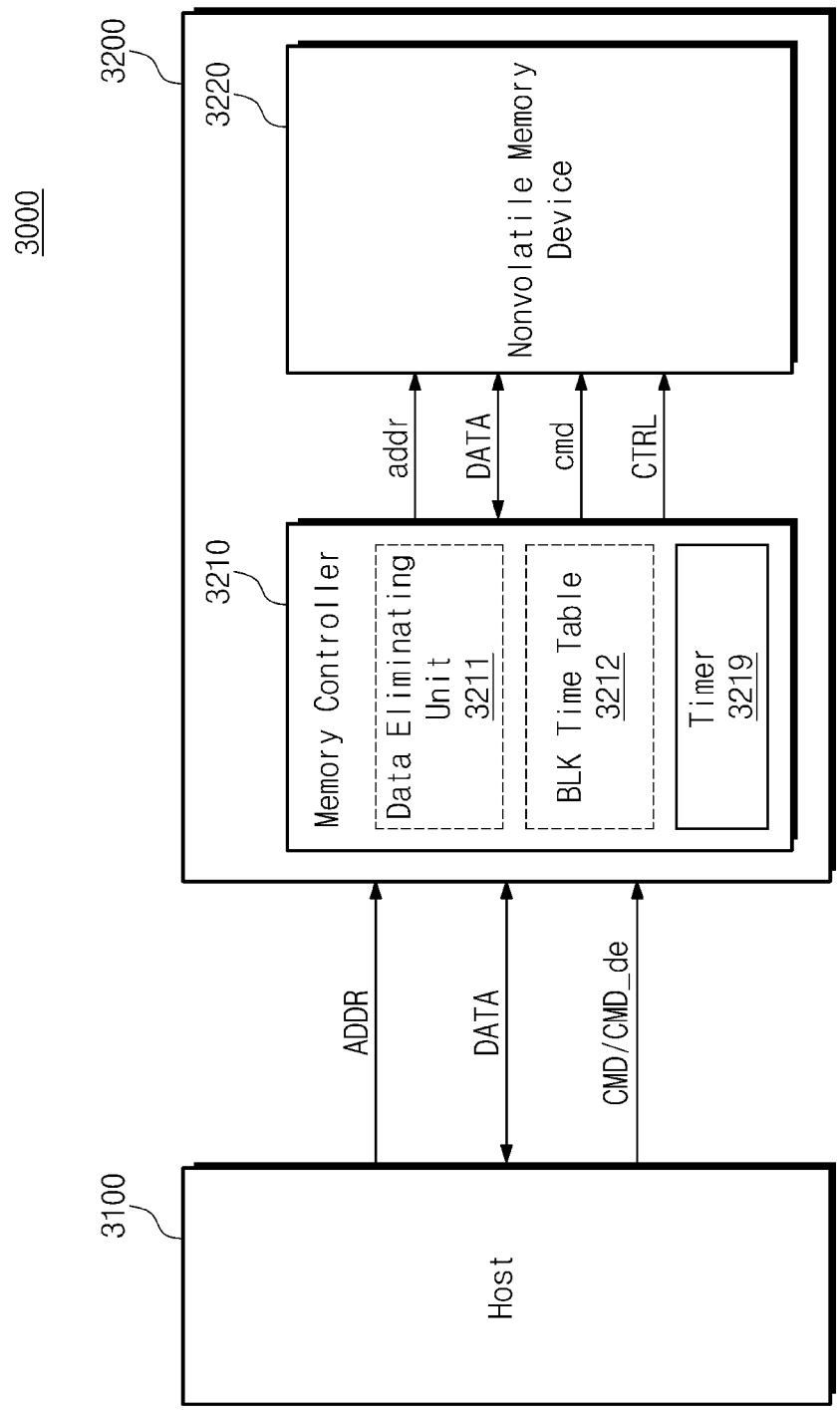
FIG. 22 is an example block diagram of a user system according to example embodiments of inventive concepts.

FIG. 22 is an example block diagram of a user system 3000 according to example embodiments of inventive concepts. As illustrated, the user system 3000 includes a host 3200 and a nonvolatile memory system 3200. The nonvolatile memory system 3200 includes a memory controller 3210 and a nonvolatile memory device 3220. The memory controller 3210 includes a data eliminating unit 3211, a block timetable 3212, and a timer 3219. Since the host 3100, the nonvolatile memory system 3200, the memory controller 3210, the nonvolatile memory device 3220, the data eliminating unit 3211, and the block timetable 3212 have been explained with reference to FIGS. 1 to 15, their detailed explanations are not repeated.

The memory controller 3210 in FIG. 22 further includes the timer 3219. The timer 3219 may generate information on current time. In some embodiments, the current time may be absolute time or relative time to reference time. Alternatively or in addition, the current time may be the counting number of operation clocks of the nonvolatile memory system 3200 or the counting number of clocks provided from the host 3100.

The memory controller 3210 may update the block timetable 3212 based on the current time generated from the timer 3219. For example, the memory controller 3210 may set reception time of data received from the host 3100 as the current time generated by the timer 3219 and update the block timetable 3212 based on the set reception time.

According to the above-described embodiments, the nonvolatile memory system 3200 may set reception time of data using the timer 3219 and manage the block timetable 3212 based on the set reception time. The nonvolatile memory system 3200 may perform the operations described with reference to FIGS. 1 to 15 based on the block timetable 3212. Thus, a nonvolatile memory system with improved security is provided.

Figure 23:
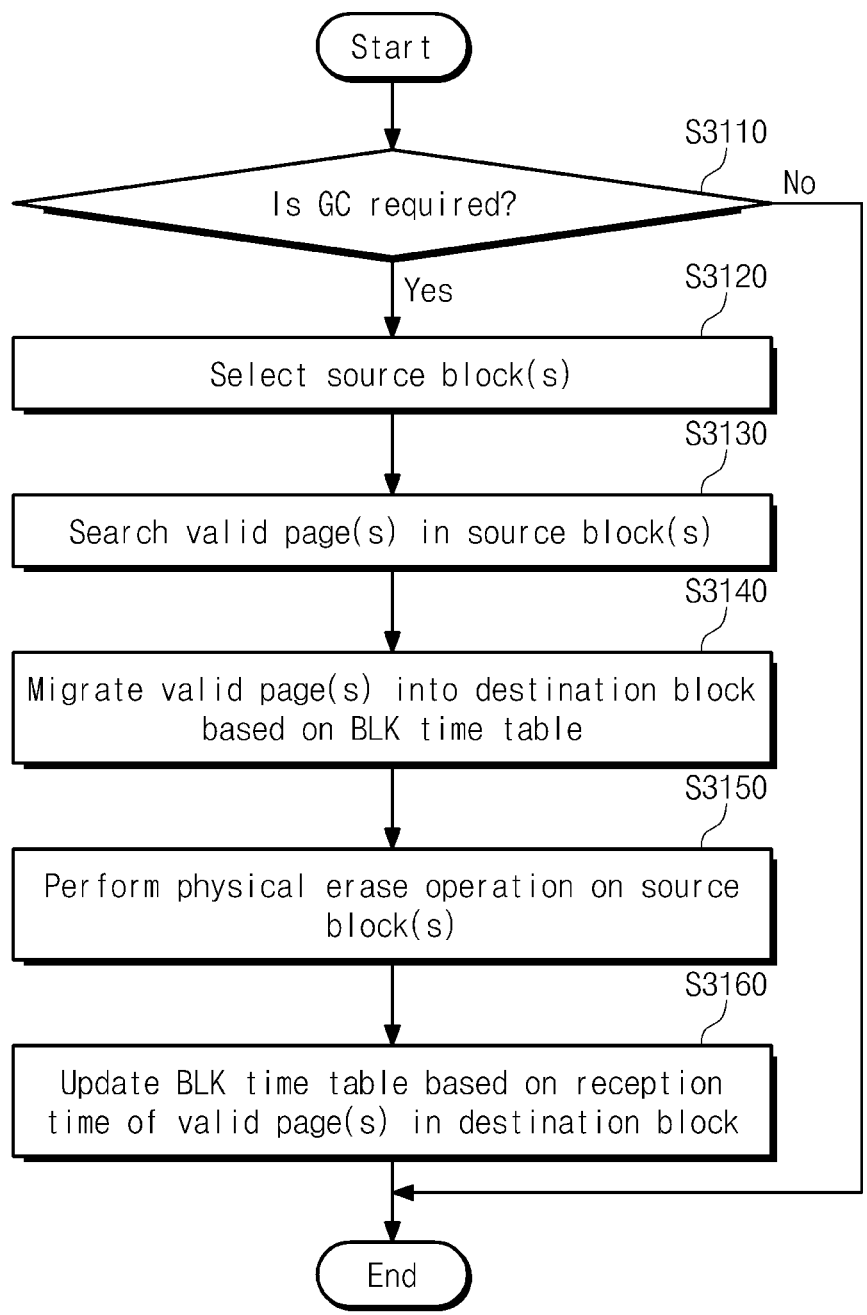
FIG. 23 is a flowchart showing an operation of a nonvolatile memory device according to example embodiments of inventive concepts.
Figure 24:
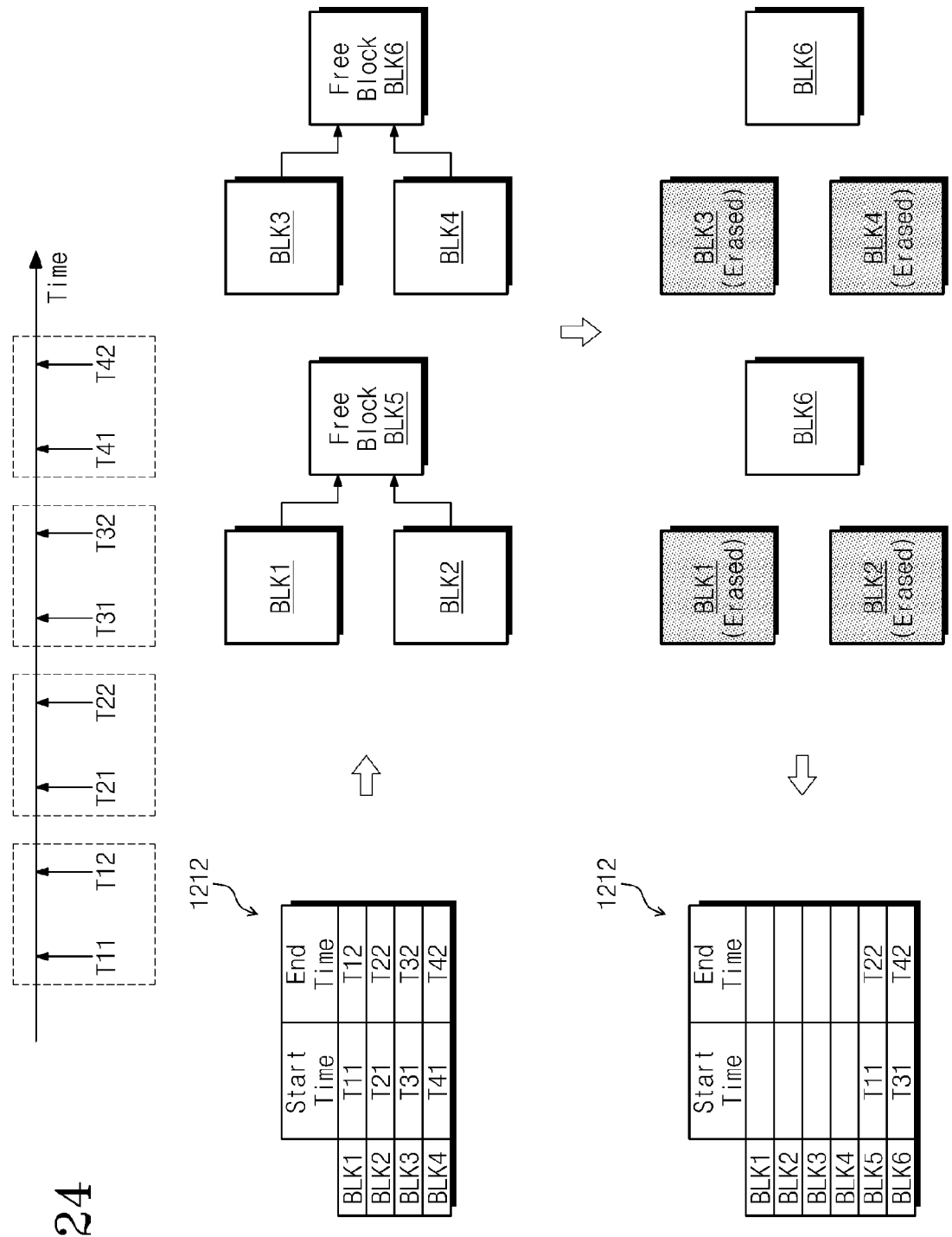
FIG. 24 is a drawing showing the operation of FIG. 23.

FIG. 23 is a flowchart showing an operation of a nonvolatile memory device according to example embodiments of inventive concepts. FIG. 24 is a drawing showing the operation of FIG. 23. A garbage collection operation of the nonvolatile memory system 1200 is described below with reference to FIGS. 23 and 24. Referring to FIGS. 1, 23, and 24, in a step S3110, the nonvolatile memory system 1200 may determine whether garbage collection GC is needed. For example, when the number of free blocks is less than a predetermined number, the nonvolatile memory system 1200 may determine that the garbage collection is needed.

When it is determined that the garbage collection is needed, the nonvolatile memory system 1200 may perform steps S3210 to S3160. In the step S3210, the nonvolatile memory system 1200 may select source blocks.

In the step S3130, the nonvolatile memory system 1200 may search valid pages included in source blocks. For example, the nonvolatile memory system 1200 may scan spare areas of the source blocks to search valid pages in which valid data is stored. Alternatively or in addition, the nonvolatile memory system 1200 may scan a mapping table (not shown) to search valid pages.

In operation S3140, the nonvolatile memory system 1200 may migrate the valid pages to a target block based on the block timetable 1212. For example, first to fourth memory blocks BLK1 to BLK4 may be selected as source blocks. As shown in FIG. 24, start reception time of the first memory block BLK1 may be time T11 and end reception time thereof may be time T12. This means that data included in the first memory block BLK1 is received between the time T11 and the time T12. Similarly, start reception time of the second memory block BLK2 may be time T21 and end reception time thereof may be time T22. Start reception time of the third memory block may be time T31 and end reception thereof may be time T32. Start reception time of the fourth memory block BLK4 may be time T41 and end reception time thereof may be time T42.

The nonvolatile memory system 1200 may migrate the valid data of the source blocks to target blocks to minimize a difference between end reception time and end reception time of the target blocks, based on the block timetable 1212. In more detailed example embodiments, time between the start reception time T11 of the first memory block BLK1 and the end reception time of the second memory block BLK2 may be shorter than a predetermined time. In this case, the nonvolatile memory system 1200 may migrate valid data included in the first and second memory blocks BLK1 and BLK2 to a fifth memory block BLK5 that is a free memory block. Similarly, time between the start reception time T31 of the third memory block BLK3 and the end reception time T42 of the fourth memory block BLK4 may be shorter than a predetermined time. In this case, the nonvolatile memory system 1200 may migrate valid data included in the third and fourth memory blocks BLK3 and BLK4 to a sixth memory block BLK6 that is a free memory block. In some embodiments, as mentioned above, start reception time and end reception time of memory blocks may be managed by migrating valid data such that a difference between start reception time and end reception time of a memory block to which data migrates is included within predetermined time.

In a step S3150, the nonvolatile memory system 1200 may perform a physical erase operation on the source blocks. For example, the nonvolatile memory system 1200 may erase the first to fourth memory blocks BLK1 to BLK4, as shown in FIG. 24.

In a step S3160, the nonvolatile memory system 1200 may update the block timetable 1212 based on reception time of valid data included in the target blocks. For example, the fifth memory block BLK5 may include valid data included in the first and second memory blocks BLK1 and BLK2, as shown in FIG. 24. That is, data included in the fifth memory block BLK5 may be data received between the time T11 and the time T22. The nonvolatile memory system 1200 may update start reception time of the fifth memory block BLK5 to the time T11 at the block timetable 1212 and update end reception time of the sixth memory block BLK6 to the time T22 at the block timetable 1212. Similarly, the nonvolatile memory system 1200 may set start reception time of the sixth memory block BLK6 as the time T31 and set end reception time thereof as the time T42. In some embodiments, start reception times and end reception times of the physically erased first to fourth memory blocks BLK1 to BLK4 may be released.

As described above, during a garbage collection operation of the nonvolatile memory system 1200, the nonvolatile memory system 1200 may migrate data received at an adjacent time point to a single target block to perform garbage collection such that data received between predetermined times is stored in the single memory block. That is, a difference between start reception time and end reception time of the single memory block is managed within a predetermined time to reduce an overhead during full elimination operation of data. Thus, security and improved performance of the nonvolatile memory system described herein is provided.

Figure 25:
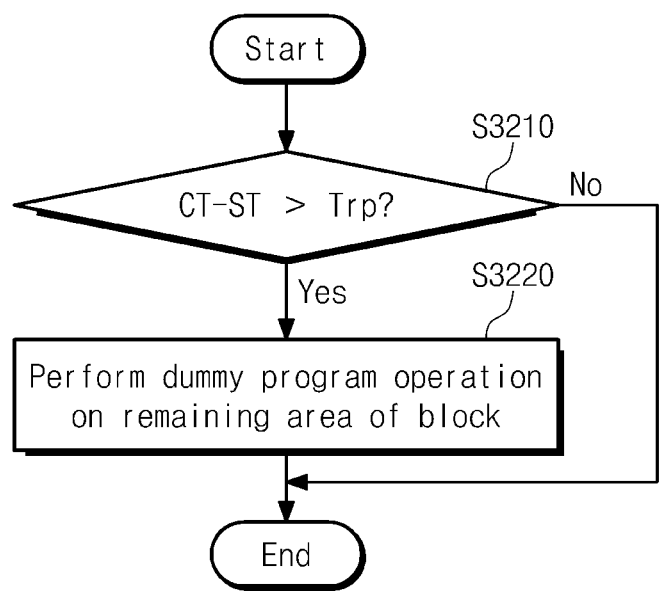
FIG. 25 is a flowchart showing an operation of a nonvolatile memory device according to example embodiments of inventive concepts.
Figure 26:
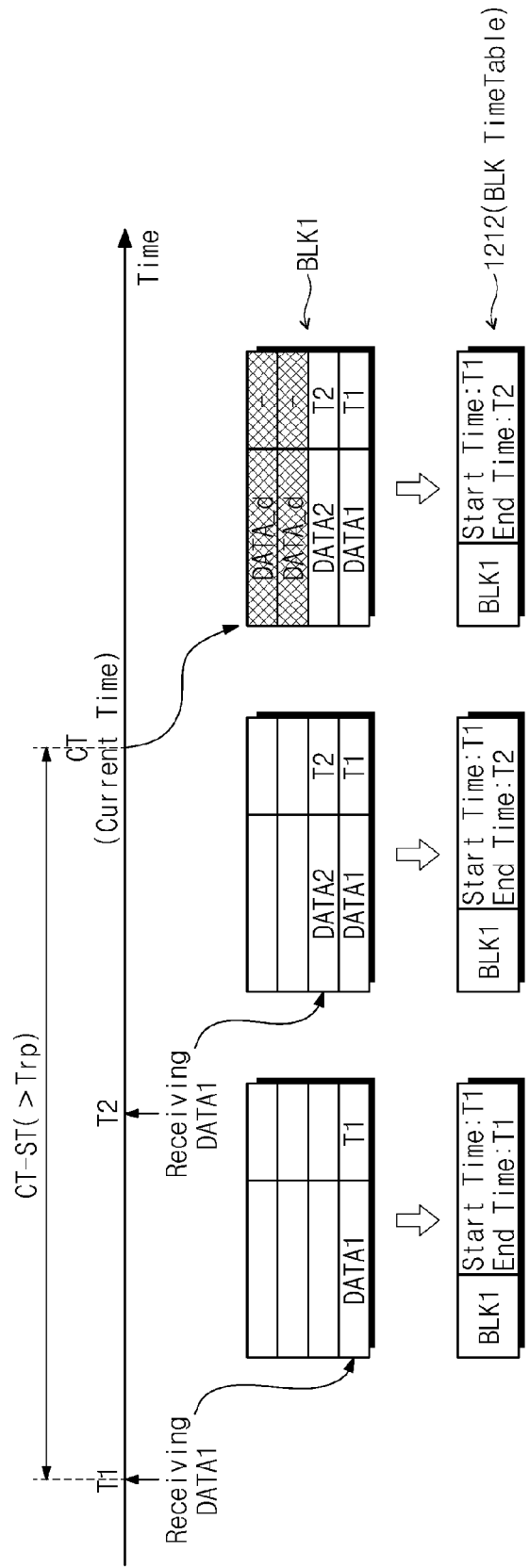
FIG. 26 is a drawing showing the operation of FIG. 25.

FIG. 25 is a flowchart showing an operation of a nonvolatile memory device according to example embodiments of inventive concepts. FIG. 26 is a drawing showing the operation of FIG. 25. Referring to FIGS. 1, 25, and 26, in a step S3210, the nonvolatile memory system 1200 may determine whether current time CT and start time ST is longer than reference time, with respect to a single memory block. For example, the nonvolatile memory system 1200 may receive first data DATA1 at first time T1, as shown in FIG. 26. The nonvolatile memory system 1200 may store the first data DATA1 in the first memory block BLK1 and update the start reception time and the end reception time of the first memory block BLK1 to the first time T1 at the block timetable 1212.

Then the nonvolatile memory system 1200 may receive second data DATA2 at second time T2 and store the received second data DATA2 in a first memory block BLK1. The nonvolatile memory system 1200 may update end reception time of the first memory block BLK1 to the second time T2 at the block timetable 1212.

As shown in FIG. 26, a difference between start reception time T1 of the first memory block BLK1 and current time CT may be longer than reference time Trp. In this case, in operation S3220, the nonvolatile memory system 1200 may perform a dummy program operation on a spare area of a memory block. For example, the nonvolatile memory system 1200 may store dummy data DATA_d in spare areas of the first memory blocks BLK1 at the current time CT, as shown in FIG. 26. In this case, the start reception time and the end reception time of the first memory block BLK1 may not be updated. That is, the nonvolatile memory system 1200 may program the dummy data DATA_d into the spare areas of the first memory blocks BLK1 and thus another data may not be stored in the first memory block BLK1 until the first memory block BLK1 is physically erased. This means that the start reception time and the end reception time of the first memory block BLK1 are maintained until the first memory block BLK1 is physically erased. Thus, a difference between the start reception time and the end reception time of the first memory block BLK1 may be managed to be included within predetermined time.

According to the operations of the nonvolatile memory system described with reference to FIGS. 23 to 26, a difference between start reception time and end reception time of a single memory block may be managed to be included within a predetermined time. More specifically, the difference between the start reception time and the end reception time of the single memory block may be managed to be included within the predetermined time to reduce an overhead resulting from the operating method described with reference to FIGS. 10 to 12. Thus, a nonvolatile memory system with improved performance and improved security is provided.

Figure 27:
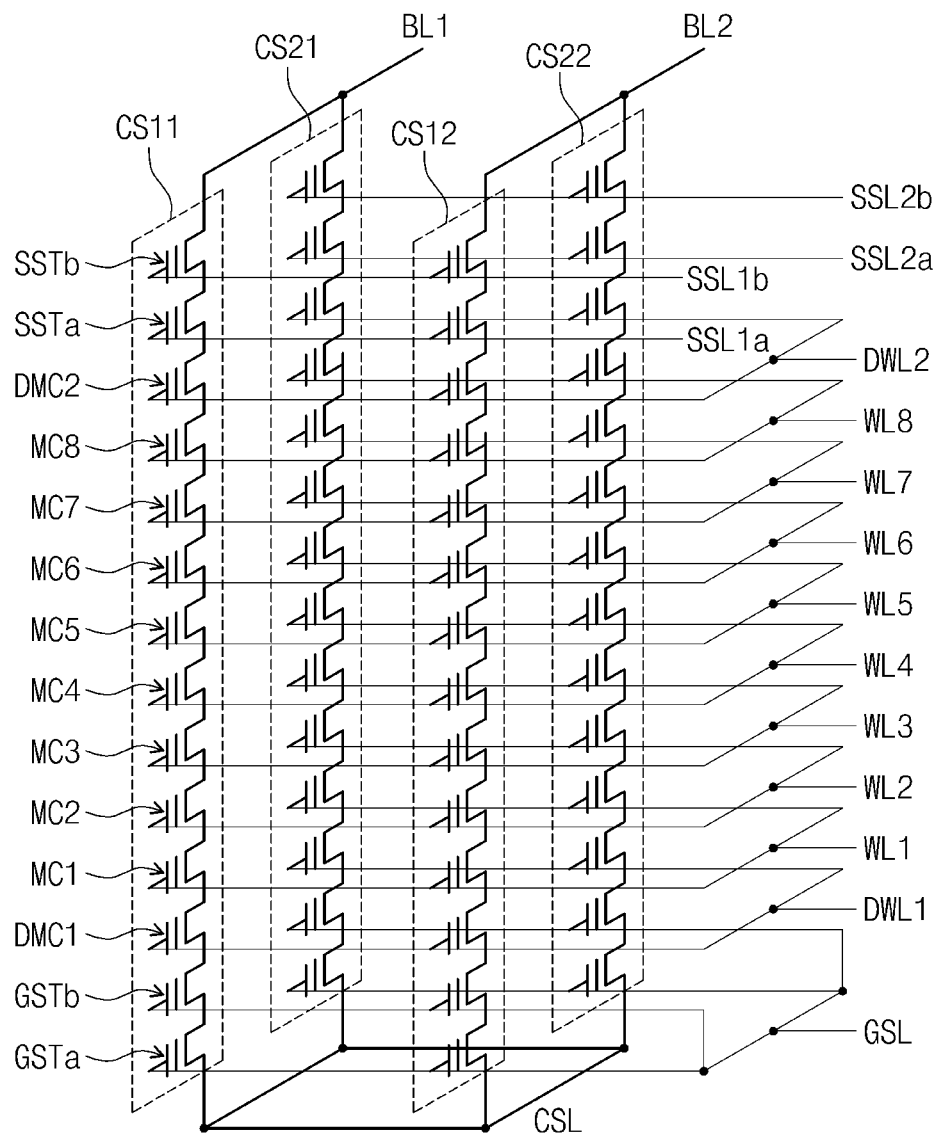
FIG. 27 is an example circuit diagram of a first memory block included in a nonvolatile memory device according to example embodiments of inventive concepts.

FIG. 27 is an example circuit diagram of a first memory block included in a nonvolatile memory device according to example embodiments of inventive concepts. A first memory block BLK1 having a three-dimensional structure is described below with reference to FIG. 27. However, example embodiments of inventive concepts are not limited thereto and other memory blocks may each have a similar structure to the first memory block BLK1.

As shown in FIG. 27, the memory block BLK1 includes a plurality of cell strings CS11, CS21, CS12, and CS22. The cell strings CS11, CS21, CS12, and CS22 may be arranged in a row direction and a column direction to form rows and columns.

For example, the cell strings CS11 and CS12 may be connected to string selection lines SSL1a and SSL1b to form a first row. The cell strings CS21 and CS22 may be connected to string selection lines SSL2a and SSL2b to form a second row.

For example, the cell strings CS11 and CS21 may be connected to a first bitline BL1 to form a first column. The cell strings CS12 and CS22 may be connected to a second bitline BL2 to form a second column.

Each of the cell strings CS11, CS12, CS21, and CS22 includes a plurality of cell transistors. For example, each of the cell strings CS11, CS12, CS21, and CS22 may include string selection transistors SSTa and SSTb, a plurality of memory cells MC1 to MC8, ground selection transistors GST1 and GSTb, and dummy memory cells DMC1 and DMC2. In some embodiments, each of a plurality of cell transistors included in the cell strings CS11, CS12, CS21, and CS22 may be a charge trap flash (CTF) memory cell.

The memory cells MC1 to MC8 are connected in series and are stacked in a height direction perpendicular to a substrate formed by a row direction and a column direction. The string selection transistors SSTa and SSTb are connected in series. The serially connected string selection transistors SSTa and SSTb are provided between the memory cells MC1 to MC8 and a bitline BL. The ground selection transistors GSTa and GSTb are connected in series. The serially connected ground selection transistors GSTa and GSTb are provided between the memory cells MC1 to MC8 and a common source line CSL.

In some embodiments, a first dummy memory cell DMC1 may be provided between the memory cells MC1 to MC8 and the ground selection transistors GSTa and GSTb. In some embodiments, a second dummy memory cell MC2 may be provided between the memory cells MC1 to MC8 and the string selection transistors SSTa and SSTb. The ground selection transistors GSTa and GSTb of the cell strings CS11, CS12, CS21, and CS22 may be commonly connected to a ground selection line GSL.

In some embodiments, ground selection transistors of the same row may be connected to the same ground selection line and ground selection transistors of a different row may be connected to a different selection line. For example, the first ground selection transistor GSTa of the cell strings CS11 and CS12 of a first row may be connected to a first ground selection line and the first ground selection transistor GSTa of the cell strings CS21 and CS22 of a second row may be connected to a second ground selection line.

In some embodiments, although not shown in the drawing, ground selection transistors provided at the same height from a substrate (not shown) may be connected to the same ground selection line and ground selection transistors provided at different heights from the substrate may be connected to different ground selection lines. For example, first ground selection transistors GSTa of the cell strings CS11, CS12, CS21, and CS22 may be connected to a first ground selection line and second ground selection transistors GSTb of the cell strings CS11, CS12, CS21, and CS22 may be connected to a second ground selection line.

Memory cells of the same height from a substrate (or the ground selection transistors GSTa and GSTb) are commonly connected to the same word line, and memory cells of different heights from the substrate (or the ground selection transistors GSTa and GSTb) are connected to different word lines. For example, first to eighth memory cells MC1 to MC8 of the cells strings CS11, CS12, CS21, and CS22 are commonly connected to first to eighth word lines WL1 to WL8, respectively.

Among the first string selection transistors SSTa of the same height, string selection transistors of the same row are connected to the same string selection line and string selection transistors of different rows are connected to different string selection lines. For example, the first string selection transistors SSTa of the cell strings CS11 and CS12 of the first row are commonly connected to a string selection line SSL1a and the first string selection transistors SSTa of the cell strings CS21 and CS22 of the second row are connected to the string selection line SSL1a.

Similarly, among the second selection transistors SSTb of the same height, string selection transistors of the same height are connected to the same string selection line and string selection transistors of different rows are connected to different string selection lines. For example, the string selection transistors SSTb of the cell strings CS11 and CS12 of the first row are commonly connected to a string selection line SSL1b and the string selection transistors SSTb of the cell strings CS21 and CS22 of the second row are commonly connected to the string selection line SSL2b.

Although not shown in the drawing, string selection transistors of cell strings of the same row may be commonly connected to the same string selection line. For example, the first and second string selection transistors SSTa and SSTb of the cell strings CS11 and CS12 of the first row may be commonly connected to the same string selection line. The first and second string selection transistors SSTa and SSTb of the cell strings CS21 and CS22 of the second row may be commonly connected to the same string selection line.

In some embodiments, dummy memory cells of the same height are connected to the same dummy word line and dummy memory cells of different heights are connected to different dummy word lines. For example, the first dummy memory cells DMC1 are connected to a first dummy word line DWL1 and second dummy memory cells DMC2 are connected to a second dummy word line DWL2.

In the first memory block BLK1, read and write operations may be performed in units of rows. For example, a single row of a memory block BLKa may be selected by the string selection lines SSL1a, SSL1b, SSL2a, and SSL2b.

For example, when the string selection lines SSL1a and SSL1b are supplied with a turn-on voltage and the string selection lines SSL2a and SSL2b are supplied with a turn-off voltage, the cell strings CS11 and CS12 of the first row are connected to the bitlines BL1 and BL2. When the string selection lines SSL2a and SSL2b are supplied with a turn-on voltage and the string selection lines SSL1a SSL1b are supplied with a turn-off voltage, the cell strings CS21 and CS22 of the second row are connected to the bitlines BL1 and BL2 to be driven. Among memory cells of a cell string of a row driven by driving a word line, memory cells of the same height are selected. Read and write operation may be performed on the selected memory cells. The selected memory cells may form a physical page unit.

In the first memory block BLK1, an erase operation may be performed in units of memory blocks or sub-blocks. When an erase operation is performed in units of memory blocks, all memory cells MC of the first memory block BLK1 may be simultaneously erased according to a single erase request. When an erase operation is performed in units of sub-blocks, some of memory cells MC of the first memory block BLK1 may be simultaneously erased according to a single erase request and the other memory cells may be erase-inhibited. A word line connected to the erased memory cells may be supplied with a low voltage (e.g., ground voltage), and a word line connected to the erase-inhibited memory cells may be floated.

In some embodiments, the first memory block BLK1 shown in FIG. 27 is merely exemplary. For example, the number of cell strings may increase or decrease, and the number of rows and columns constituted by cell strings may increase or decrease according to the number of the cell strings. Moreover, the number of cell transistors GSTS, MC, DMC, SST, and the like of the first memory block BLK1 may increase or decrease, and height of the first memory block BLK1 may increase or decrease according to the number of the cell transistors. The number of lines GSL, WL, DWL, SSL, and the like connected to the cell transistors may increase or decrease according to the number of the cell transistors.

Figure 28:
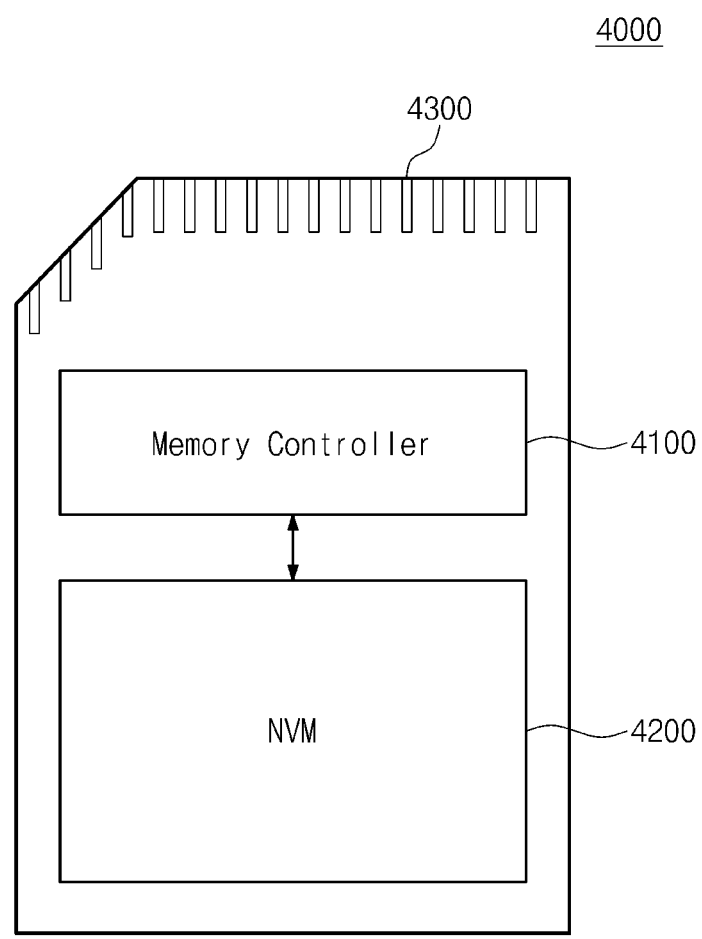
FIG. 28 is an example block diagram of a memory card system including a nonvolatile memory system according to example embodiments of inventive concepts.

FIG. 28 is an example block diagram of a memory card system 4000 including a nonvolatile memory system according to example embodiments of inventive concepts. As illustrated, the memory card system 4000 includes a controller 4100, a nonvolatile memory 4200, and a connector 4300.

The controller 4100 is connected to a nonvolatile memory 4200. The controller 4100 is configured to access the non-volatile memory 4200. For example, the controller 4100 is configured to control read, write, erase, and background operations of the nonvolatile memory 4200. The controller 4100 is configured to provide interfacing between the nonvolatile memory 4200 and a host (e.g., 1100 of FIG. 1). The background operation may include operations such as wear-leveling management and garbage collection.

The controller 4100 is configured to provide interfacing between the nonvolatile memory 4200 and a host (e.g., 1100 of FIG. 1). The controller 4100 is configured to drive firmware for controlling the nonvolatile memory device 4200.

In some embodiments, the controller 4100 may include elements such as a random access memory (RAM), a processing unit, a host interface, a memory interface, and an error correction unit. The controller 4100 may communicate with an external device through a connector 4300. The controller 4100 may communicate with an external device according to a particular communication protocol. For example, the controller 4100 may communicate with the external device through at least one of various interface protocols such as, but not limited to, universal serial bus (USB, multimedia card (MMC), eMMC (embedded MMC), peripheral component interconnection (PCI), PCI-express (PCI-E), advanced technology attachment (ATA), a serial-ATA protocol, parallel-ATA, small computer small interface (SCSI), improved small disk interface (ESDI), integrated drive electronics (IDE), UFS (Universal Flash Storage), WiFi, Bluetooth, NVMe, and Firewire.

The nonvolatile memory 4200 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In some embodiments, the controller 4100 and the non-volatile memory device 4200 may be integrated into a single semiconductor device. In some embodiments, the controller 4100 and the non-volatile memory device 4200 may be integrated into a single semiconductor device to constitute a solid state drive (SSD). The controller 4100 and the non-volatile memory device 4200 may be integrated into a single semiconductor device to constitute a memory card. For example, The controller 4100 and the non-volatile memory device 4200 may be integrated into a single semiconductor device to constitute a memory card such as a PC card (PCMCIA, personal computer memory card international association), a compact flash card (CF), a smart media card (SM, SMC), a memory stick, a multimedia card (MMC, RS-MMC, MMCmicro), an SD card (SD, miniSD, microSD, SDHC) and a universal flash storage (UFS).

The nonvolatile memory device 4200 or the memory system 4000 may be mounted in various types of packages. For example, the nonvolatile memory device 4200 or the memory system 4000 may be packaged by one of a package on package (PoP), ball grid arrays (BGAs), chip scale packages (CSPs), a plastic leaded chip carrier (PLCO), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline (SOIC), a shrink small outline package (SSOP), a thin small outline package (BOP), a system in package (SIP), a multi-chip package (MCP), a wafer-level fabricated package (WFP), and a wafer-level processed stack package (WSP).

In some embodiments, the memory card system 4000 may perform the operations described with reference to FIGS. 1 to 26.

Figure 29:
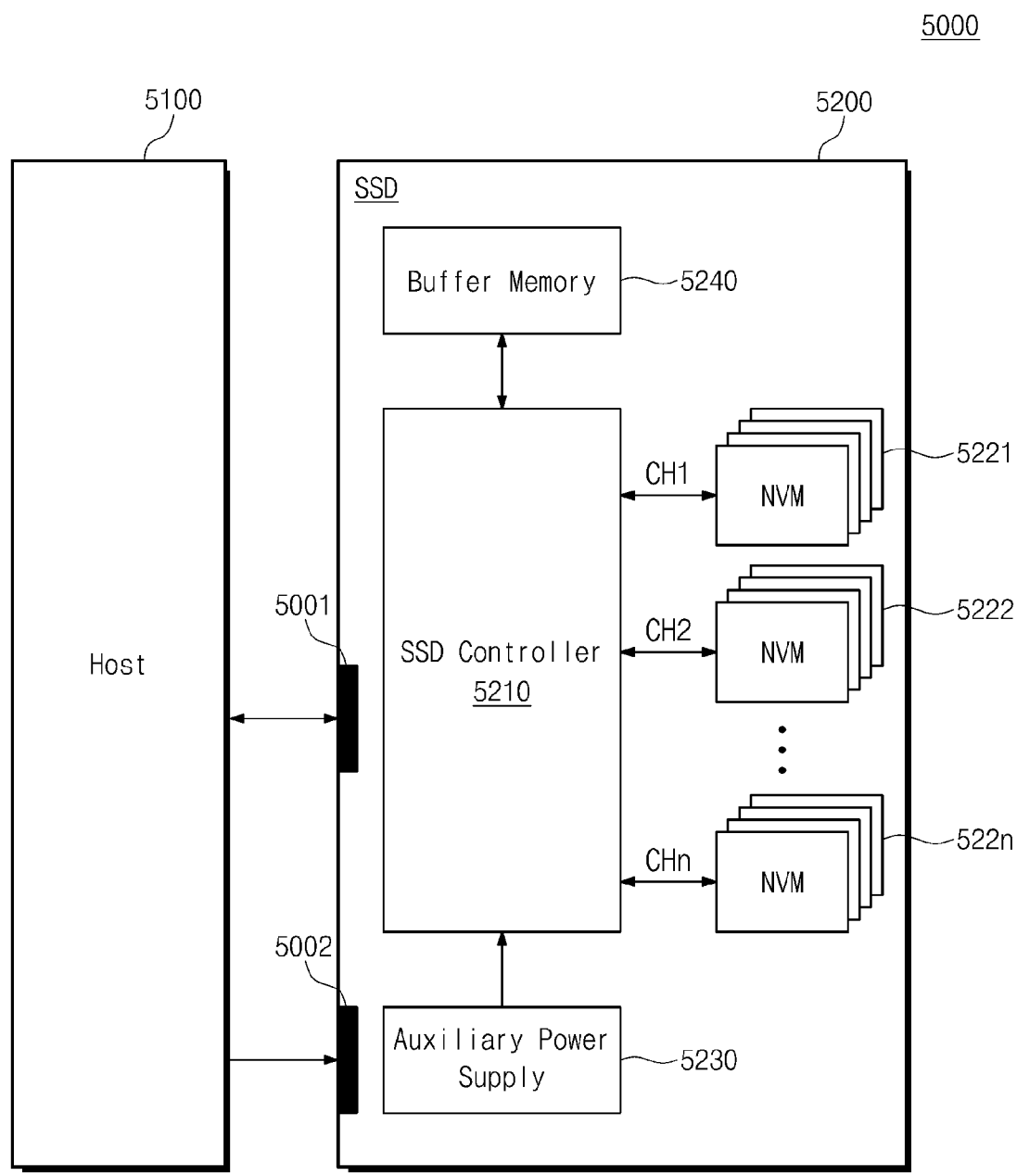
FIG. 29 is an example block diagram of a solid-state drive (SSD) system including a nonvolatile memory system according to example embodiments of inventive concepts.

FIG. 29 is an example block diagram of a solid-state drive (SSD) system 5000 including a nonvolatile memory system according to example embodiments of inventive concepts. As illustrated, the SSD system 5000 includes a host 5100 and an SSD 5200. The SSD 5200 transmits/receives a signal to/from the host 5100 via connector 5001, and receives power via a power connector 5002. The SSD 5200 includes an SSD controller 5210, a plurality of flash memories 5221 to 522n, an auxiliary power supply 5230, and a buffer memory 5240.

The SSD controller 5210 may control the flash memories 5221 to 522n in response to the signal received from the host 5100 via the connector 5001. The flash memories 5221 to 522n may perform a program operation according to the control of the SSD controller 5210.

The auxiliary power supply 5230 is connected to the host 5100 via the power connector 5002. The auxiliary power supply 5230 may receive the power from the host 5100 to be charged. The auxiliary power supply 5230 may supply power of the SSD system 5000 when power is not sufficiently supplied from the host 5100. In some embodiments, the auxiliary power supply 5230 may be disposed inside or outside the SSD 5200. For example, the auxiliary power supply 5230 may be disposed at a main board and may supply auxiliary power to the SSD 5200.

The buffer memory 5240 operates as a buffer memory of the SSD 5200. For example, the buffer memory 5240 may temporarily store data received from the host 5100 or data received from the flash memories 5221 to 522n, or may temporarily store metadata (e.g., mapping table) of the flash memories 5221 to 522n. The buffer memory 5240 may include a nonvolatile memory such as DRAM, SDRAM, DDR SDRAM, LPDDR SDRAM, and SRAM or a nonvolatile memory such as FRAM ReRAM, STT-MRAM, and PRAM.

In some embodiments, the SSD 5200 may perform the operations described with reference to FIGS. 1 to 26. In some embodiments, reception time of data may indicate time at which data received from the host 5100 is stored in the buffer memory 5240.

Figure 30:
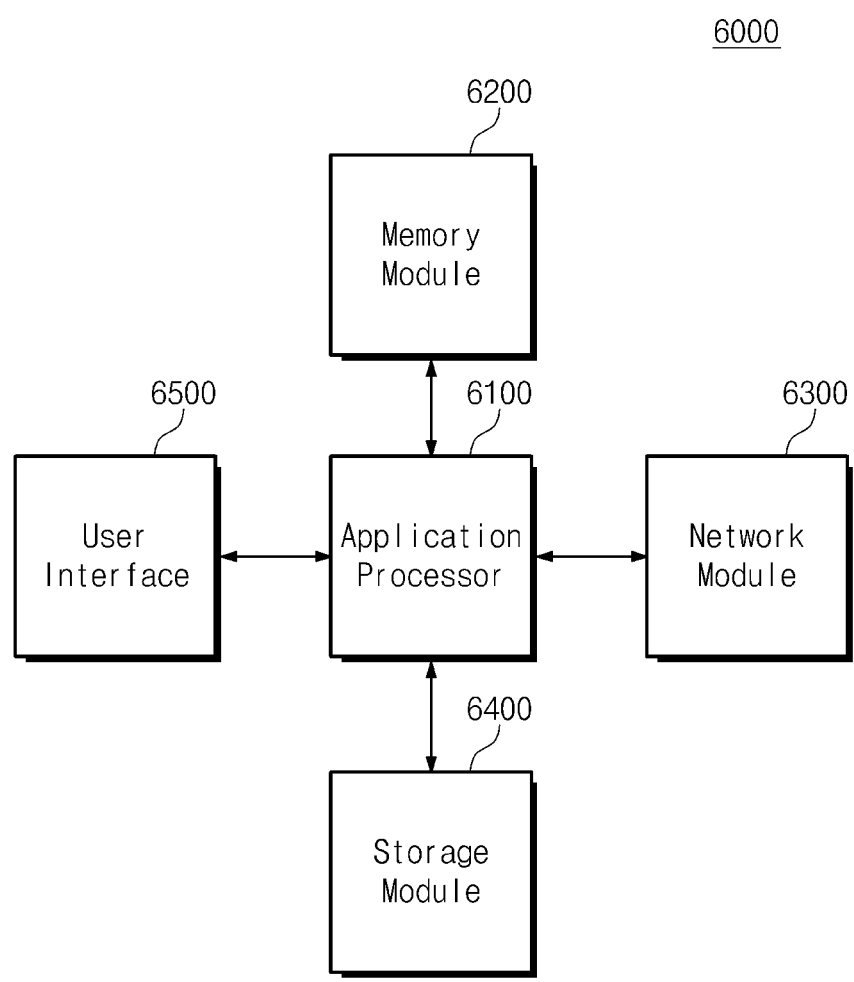
FIG. 30 is an example block diagram of a user system including a nonvolatile memory system according to example embodiments of inventive concepts.

FIG. 30 is an example block diagram of a user system 6000 including a memory system according to example embodiments of inventive concepts. As illustrated, the user system 6000 includes an application processor 6100, a memory module 6200, a network module 6300, a storage module 6400, and a user interface 6500.

The application processor 6100 may drive components incorporated in the user system 6000, an operating system (OS) or various programs. In some embodiments, the application processor 6100 may include controllers to control components incorporated in the user system 6000, interfaces, a graphic engine, and the like. The application processor 6100 may be provided as a system-on-chip (SoC).

The memory module 6200 may operate as a main memory, a working memory, a buffer memory or a cache memory of the user system 6000. The memory module 6200 may include a volatile random access memory such as DRAM, SDRAM, DDR SDRAM, DDR2 SDRAM, DDR3 SDRAM, LPDDR DRAM, LPDDR2 DRAM, LPDDR3, and DRAM and a nonvolatile random access memory such as PRAM, ReRAM, MRAM, and FRAM. In some embodiments, the memory module 6200 and the application processor 6100 may be packed using package-on-package (PoP).

The network module 6300 may communicate with external devices. In some embodiments, the network module 6300 may support wireless communication such as CDMA (Code Division Multiple Access), GSM (Global System for Mobile communication), WCDMA (wideband CDMA), CDMA-2000, TDMA (Time Division Multiple Access), LTE (Long Term Evolution), Wimax, WLAN, UWB, Bluetooth, and WI-DI. In some embodiments, the network module 6300 may be included in the application processor 6100.

The storage module 6400 may store data. For example, the storage module 6400 may store data received from the application processor 6100. Alternatively or in addition, the storage module 6400 may transmit its stored data to the application processor 6100. In some embodiments, the storage module 6400 may be implemented using a semiconductor memory device such as a phase-change RAM (PRAM), a magnetic RAM (MRAM), a resistive RAM (RRAM), a NAND flash memory, a NOR flash memory, and a three-dimensional NAND flash memory. In some embodiments, the storage module 6400 may perform the operations described with reference to FIGS. 1 to 26.

The user interface 6500 may interfaces to input data or a command to the application processor 6100 or output data to an external device. For example, the user interface device 6500 may include user input interfaces such as a keyboard, a keypad, a button, a touch panel, a touch screen, a touch ball, a touch pad, a camera, a gyroscope sensor, and a vibration sensor. The user interface device 6500 may include user output interfaces such as an liquid crystal display (LCD), an organic light emitting diode (OLED) display, an active matrix OLED (AMOLED) display, an LED, a speaker, and a motor.

According to embodiments of inventive concepts, a nonvolatile memory system may manage reception time of data received from a host depending on each memory block or each data. The nonvolatile memory system may fully eliminate data based on the managed reception time. Thus, security and performance of the nonvolatile memory system described herein is improved.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of inventive concepts is to be determined by the broadest permissible interpretation of the following claims and their equivalents, and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A nonvolatile memory system comprising:
   a nonvolatile memory device including a plurality of memory blocks; and
   a memory controller configured to control the nonvolatile memory device based on one or more commands received from a host, wherein the memory controller is configured to manage a start reception time and an end reception time of data of each of the plurality of memory blocks, and to physically erase at least one memory block from among the plurality of memory blocks based on the managed start reception time and the managed end reception time.

2. The nonvolatile memory system as set forth in claim 1, wherein the start reception time indicates a reception time of first received data among data associated with a particular block from among the plurality of memory blocks, and the end reception time indicates a reception time of last received data among the data associated with the particular block from among the plurality of memory blocks.

3. The nonvolatile memory system as set forth in claim 1, wherein the memory controller is configured to receive a data elimination command including a reference time from the host, and to physically erase the at least one memory block based on the reference time, the start reception time, and the end reception time in response to the data elimination command.

4. The nonvolatile memory system as set forth in claim 3, wherein the end reception time of the at least one memory block is ahead of the reference time.

5. The nonvolatile memory system as set forth in claim 3, wherein the start reception time of the at least one memory block lags behind the reference time.

6. The nonvolatile memory system as set forth in claim 3, wherein the memory controller is configured to select data not to be eliminated among data stored in the at least one memory block, and to migrate the selected data to a free memory block.

7. The nonvolatile memory system as set forth in claim 6, wherein the data not to be eliminated includes at least one of valid data, metadata managed by the host, or metadata managed by the memory controller.

8. The nonvolatile memory system as set forth in claim 1, wherein the memory controller is configured to receive the data at a corresponding plurality of reception times, to store the received data in a user area of a memory block from among the plurality of memory blocks, and to store the corresponding plurality of reception times in a spare area corresponding to the user area in which the received data is stored.

9. The nonvolatile memory system as set forth in claim 1, wherein the memory controller is configured to receive an absolute time from the host, and to update the start reception time and the end reception time of the data of each of the plurality of memory blocks based on the received absolute time.

10. The nonvolatile memory system as set forth in claim 1, wherein the memory controller is configured to program dummy data into a remaining area of a particular memory block from among the plurality of memory blocks when a difference between the end reception time of the particular memory block and a current time exceeds a reference time.

11. The nonvolatile memory system as set forth in claim 1, wherein the memory controller is configured to program random data into the physically erased at least one memory block, and to physically re-erase the programmed at least one memory block.

12. The nonvolatile memory system as set forth in claim 1, wherein each of the memory blocks comprises a nonvolatile memory that is monolithically formed in one or more physical levels of memory cells having active areas disposed above a silicon substrate.

* * * * *